(12) United States Patent
Yamaguchi et al.

(10) Patent No.: US 11,446,983 B2
(45) Date of Patent: Sep. 20, 2022

(54) ELECTRONIC CONTROL UNIT FOR AIR CONDITIONER

(71) Applicant: DENSO CORPORATION, Kariya (JP)

(72) Inventors: Akira Yamaguchi, Kariya (JP);
Tetsuya Takechi, Kariya (JP);
Yoshiharu Endo, Kariya (JP);
Terukazu Higuchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 774 days.

(21) Appl. No.: 16/431,863

(22) Filed: Jun. 5, 2019

(65) Prior Publication Data

US 2019/0283537 A1 Sep. 19, 2019

Related U.S. Application Data

(63) Continuation of application No. PCT/JP2017/040495, filed on Nov. 9, 2017.

(30) Foreign Application Priority Data

Dec. 20, 2016 (JP) .............................. JP2016-246982

(51) Int. Cl.
*B31F 1/00* (2006.01)
*B60H 1/00* (2006.01)
(Continued)

(52) U.S. Cl.
CPC ..... *B60H 1/00914* (2013.01); *B60H 1/00735* (2013.01); *B60H 1/00807* (2013.01);
(Continued)

(58) Field of Classification Search
CPC ............ B60H 1/00914; B60H 1/00735; B60H 1/00807; B60H 1/00828; B60H 1/03; B60H 2001/3266
(Continued)

(56) References Cited

U.S. PATENT DOCUMENTS 4,417,688 A * 11/1983 Schnaibel .......... B60H 1/00735
165/203
5,873,777 A * 2/1999 Auvity ............... B60H 1/00735
454/75
(Continued)

FOREIGN PATENT DOCUMENTS

JP H05058142 A 3/1993
JP H07005824 U 1/1995
(Continued)

*Primary Examiner* — Davis D Hwu
(74) *Attorney, Agent, or Firm* — Harness, Dickey & Pierce, P.L.C.

(57) ABSTRACT

An electronic control unit is applied to an air conditioner, the air conditioner including a heating unit which heats a heat medium, a casing which allows an air flow to circulate toward a compartment, a blower which generates the air flow in the casing, and a heat exchanger disposed in the casing that heats the air flow by exchanging heat between the heat medium heated by the heating unit and the air flow. The blower air volume of the blower is controlled based on a first candidate value determined based on an estimated blowing temperature, and a second candidate value determined based on a required blowing air temperature and the estimated blowing temperature. The second candidate value is set as a predetermined value when a warm-up operation of the heating unit is completed.

10 Claims, 5 Drawing Sheets

(51) Int. Cl.
*B60H 1/03* (2006.01)
*B60H 1/32* (2006.01)

(52) U.S. Cl.
CPC ........... *B60H 1/00828* (2013.01); *B60H 1/03* (2013.01); *B60H 2001/3266* (2013.01)

(58) Field of Classification Search
USPC ......................................................... 156/202
See application file for complete search history.

(56) References Cited

U.S. PATENT DOCUMENTS

| 2004/0035568 | A1* | 2/2004 | Katou | B60H 1/00842 |
| | | | | 165/204 |
| 2015/0122473 | A1* | 5/2015 | Nii | B60H 1/00021 |
| | | | | 165/202 |
| 2016/0243922 | A1 | 8/2016 | Sekito et al. | |

FOREIGN PATENT DOCUMENTS

| JP | H11105535 A | 4/1999 |
| JP | 2006188193 A | 7/2006 |
| JP | 2015110404 A | 6/2015 |
| JP | 2016043752 A | 4/2016 |

\* cited by examiner

ELECTRONIC CONTROL UNIT FOR AIR CONDITIONER

The present application is a continuation application of International Patent Application No. PCT/JP2017/040495 filed on Nov. 9, 2017, which designated the United States and claims the benefit of priority from Japanese Patent Application No. 2016-246982 filed on Dec. 20, 2016. The entire disclosures of the above applications are incorporated herein by reference.

TECHNICAL FIELD

The present disclosure relates to an electronic control unit applied to an air conditioner.

BACKGROUND

In the field of vehicle air conditioners, a blower in a vehicle air conditioner may be controlled to blow out a specific target air volume into a vehicle compartment. The target air volume of the blower may be set based on a variety of parameters, such as engine cooling water temperature. The process of setting the target air volume of the blower is subject to improvement.

SUMMARY

According to one aspect of the present disclosure, an electronic control unit is applied to an air conditioner, the air conditioner including a heating unit which heats a heat medium, a casing which allows an air flow to circulate toward a compartment, a blower which generates the air flow in the casing, and a heat exchanger disposed in the casing that heats the air flow by exchanging heat between the heat medium heated by the heating unit and the air flow. The electronic control unit includes a first temperature calculation unit that obtains an estimated blowing temperature which is an estimation value of a temperature of the air flow heated by the heat exchanger, a first determination unit that determines, based on the estimated blowing temperature, a candidate value of a target blowing air volume of the blower, a second temperature calculation unit that obtains a required blowing air temperature, which is an air temperature required to be blown from the casing into the compartment to change the air temperature in the vehicle compartment toward a set temperature, a control unit that controls the heating unit to perform a warm-up to raise a temperature of the heat medium to a target temperature, a determination unit that determines whether or not the warm-up is in a halfway state based on the estimated blowing temperature and the required blowing air temperature, a second determination unit that determines a candidate value of the target blowing air volume of the blower based on the required blowing air temperature and the estimated blowing temperature when the determination unit determines that the warm-up is in the halfway state, and sets the candidate value of the target blowing air volume of the blower as a predetermined value when the determination unit determines that the warm-up has been completed, and a third determination unit that determines the target blowing air volume of the blower by using the candidate value determined by the first determination unit and the candidate value determined by the second determination unit.

According to another aspect of the present disclosure, an air conditioning system for a vehicle includes a heating unit that heats a heat medium, a casing configured to allow an air flow to circulate toward a vehicle compartment of the vehicle, a blower configured to generate the air flow in the casing, a heat exchanger disposed in the casing configured to heat the air flow by exchanging heat between the heat medium heated by the heating unit and the air flow, and an electronic control unit coupled to the heating unit and the blower. The electronic control unit includes at least one processor programmed to obtain an estimated blowing temperature which is an estimation value of a temperature of the air flow heated by the heat exchanger, determine, based on the estimated blowing temperature, a first candidate value for a target blowing air volume of the blower, obtain a required blowing air temperature, which is an air temperature required to be blown from the casing into the vehicular compartment to change the air temperature in the compartment toward a set temperature, control the heating unit to perform a warm-up to raise a temperature of the heat medium to a target temperature, after controlling the heating unit to perform the warm-up, determine whether the warm-up is in a halfway state or has been completed based on the estimated blowing temperature and the required blowing air temperature, upon determining that the warm-up is in the halfway state, determine a second candidate value for the target blowing air volume of the blower based on the required blowing air temperature and the estimated blowing temperature, upon determining that the warm-up has been completed, set the second candidate value of the target blowing air volume of the blower as a predetermined value when the determination unit determines that the warm-up has been completed, and after determining the first candidate value and the second candidate value, drive the blower with an applied voltage calculated based on the first candidate value and the second candidate value.

DETAILED DESCRIPTION

Figure 1:
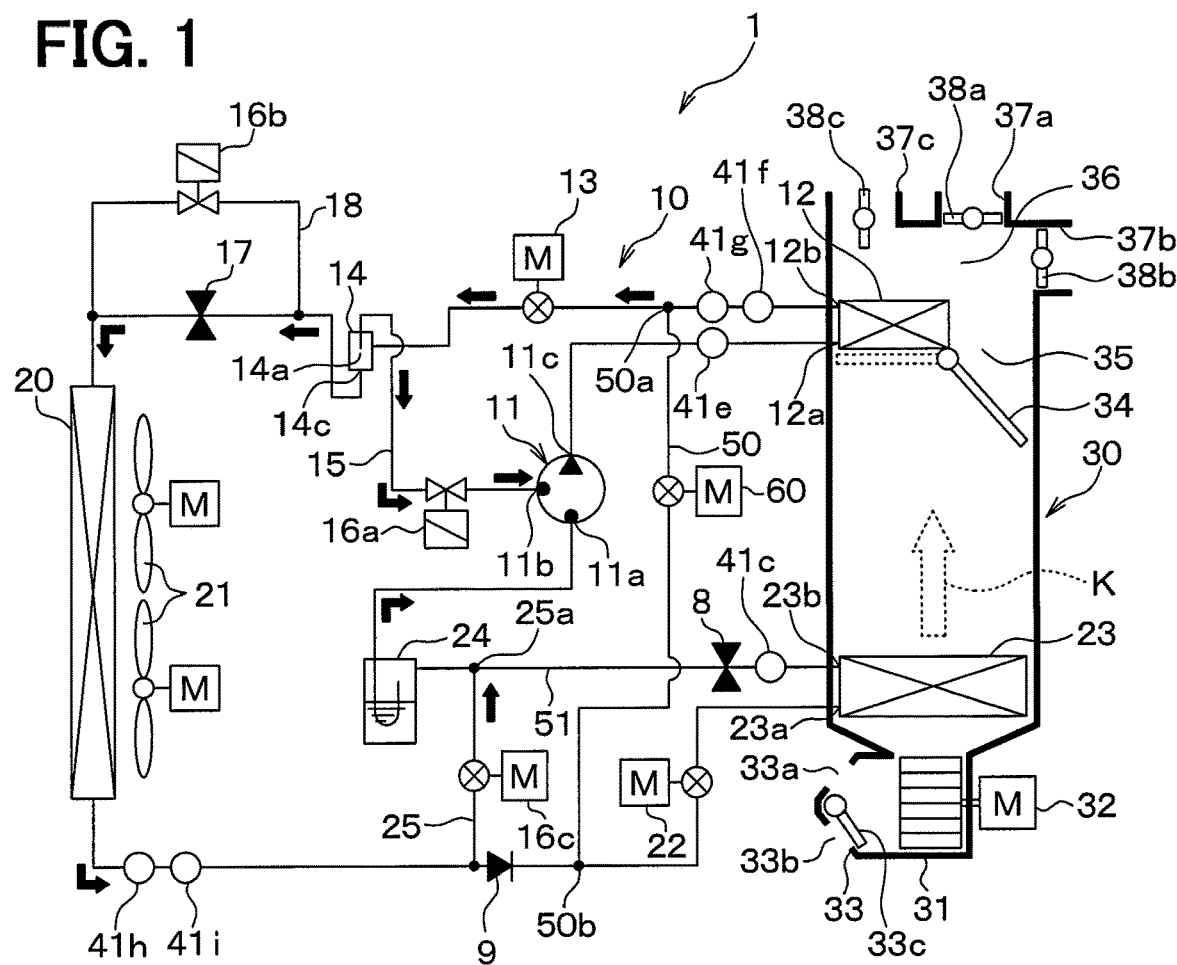
FIG. 1 is a diagram showing an overall configuration of a heat pump cycle according to a first embodiment.

Embodiments of the present disclosure will be described below with reference to the drawings. In the drawings, the same reference numerals are assigned to the same or equivalent parts in the following embodiments in order to simplify the description.

First Embodiment

A first embodiment of the present disclosure will be described with reference to FIG. 1. In the present embodiment, a heat pump cycle 10 according to the present disclosure is applied to a vehicle air conditioner 1 of an electric vehicle or a hybrid vehicle which obtains a driving force for vehicle travel from a traveling electric motor. The heat pump cycle 10 performs a function of cooling or heating a vehicle interior blown air, which is blown into a vehicle compartment representing an interior of the present disclosure, in the vehicle air conditioner 1.

Therefore, the heat pump cycle 10 according to the present embodiment is configured to be able to switching among a refrigerant circuit in a heating mode for heating the vehicle compartment, a refrigerant circuit in a cooling mode for cooling the vehicle compartment, and a refrigerant circuit in a dehumidification heating mode for dehumidifying and heating the vehicle compartment. In FIG. 1, extremely thick arrows indicate a flow of the refrigerant in the heating mode.

The heat pump cycle 10 employs an HFC based refrigerant (for example, R134a) as the refrigerant, and configures a vapor compression type subcritical refrigeration cycle in which a high-pressure side refrigerant pressure does not exceed a critical pressure of the refrigerant. It is needless to say that an HFO based refrigerant (for example, R1234yf) or the like may be employed. A lubricant as a refrigerator oil for lubricating parts such as a compression mechanism and a bearing of the compressor 11 is mixed into the refrigerant, and the lubricating oil circulates in a refrigerant circuit together with the refrigerant. The refrigerant corresponds to a heating medium.

Of the components of the heat pump cycle 10, the compressor 11 is disposed inside an engine hood of the vehicle, and draws, compresses and discharges the refrigerant in the heat pump cycle 10. The compressor 11 is a two-stage boost electric compressor configured to house two compression mechanisms including a low-stage side compression mechanism and a high-stage side compression mechanism each formed of a fixed-capacity compression mechanism, and an electric motor for rotationally driving both the compression mechanisms, inside a housing forming an outer shell of the compressor 11.

The housing of the compressor 11 is provided with an intake port 11a for suctioning a low-pressure refrigerant from an outside of the housing to the low-stage side compression mechanism. Further, the housing is provided with an intermediate-pressure port 11b through which an intermediate-pressure refrigerant flows from the outside of the housing into the interior of the housing to join the intermediate-pressure refrigerant in a compression process. Further, the housing is provided with a discharge port 11c for discharging a high-pressure refrigerant discharged from the high-stage side compression mechanism to the outside of the housing. In this example, the intermediate-pressure port 11b is connected to a refrigerant discharge port side of the low-stage side compression mechanism (that is, the refrigerant intake port side of the high-stage side compression mechanism).

In other words, the compressor 11 compresses the refrigerant drawn through the intake port 11a to a refrigerant with an intermediate pressure lower than the high-pressure refrigerant (that is, the refrigerant in the compression process), and merges the compressed refrigerant with the intermediate-pressure port 11b into the high-pressure refrigerant.

The low-stage side compression mechanism and the high-stage side compressor can be formed by various types of compression mechanisms such as a scroll-type compression mechanism, a vane-type compression mechanism, and a rolling piston-type compression mechanism. The compressor 11 corresponds to a heating unit.

The operation (for example, rotation speed) of the electric motor is controlled according to a control signal output from an electronic control unit 40, which will be described later, and the electric motor may be formed by, for example, an AC synchronous motor. With the rotation speed control, a refrigerant discharge capacity of the compressor 11 is changed.

In the present embodiment, the compressor 11 in which the two compression mechanisms are accommodated in one housing is employed, but the type of the compressor is not limited to the above type. In other words, if the intermediate-pressure refrigerant is caused to flow from the intermediate-pressure port 11b to merge with the refrigerant in the compression process, the electric compressor may be configured such that a single fixed displacement type compression mechanism and an electric motor that rotationally drives the compression mechanism are housed inside of the housing.

An inlet 12a side of an interior condenser (that is, a first heat exchanger) 12 is connected to the discharge port 11c of the compressor 11. The vehicle interior condenser 12 is a radiator that is disposed in a casing 31 of a vehicle interior air conditioning unit 30 of the vehicle air conditioner, which will be described later, radiates the heat of the high-pressure refrigerant discharged from the high-stage side compression mechanism of the compressor 11, and heats a vehicle interior blown air that has passed through a vehicle interior evaporator 23 to be described later.

An outlet 12b side of the interior condenser 12 is connected with an inlet side of a high-stage side expansion valve 13 functioning as a high-stage side pressure reducing portion capable of reducing a pressure of the high-pressure refrigerant flowing out of the interior condenser 12 into the intermediate-pressure refrigerant.

The high-stage side expansion valve 13 is an electric variable throttle mechanism including a valve body of which a throttle opening is changeable and an actuator formed of a stepping motor that changes the throttle opening degree of the valve body. The throttle opening degree represents an opening degree of a refrigerant flow channel between an outlet of the interior condenser 12 and an inlet of a gas-liquid separator 14.

The high-stage side expansion valve 13 is configured so as to be put into a throttle state in which a pressure reducing action of the refrigerant is exerted and a fully opened state in which the pressure reducing action of the refrigerant is not exerted. The high-stage side expansion valve 13 is also configured to be able to be in a fully closed state in which a refrigerant flow channel between the outlet of the interior condenser 12 and the inlet of the gas-liquid separator 14 is fully closed. The operation of the high-stage side expansion valve 13 is controlled according to a control signal output from the electronic control unit 40.

An outlet side of the high-stage side expansion valve 13 is connected with a refrigerant inflow port of the gas-liquid separator 14 as a separator that separates the intermediate-pressure refrigerant that has flowed out from the interior condenser 12 and whose pressure has been reduced by the high-stage side expansion valve 13 into a gas and a liquid.

The gas-liquid separator 14 according to the present embodiment is of a centrifugal separation type that separates the refrigerant drawn from the refrigerant inflow port into "a gas-phase refrigerant excluding a lubricant" and "a remaining refrigerant including the lubricant" by the aid of a centrifugal force. The gas-liquid separator 14 of a type other than the centrifugal separation type may be used.

In this example, the gas-liquid separator 14 is provided with a gas-phase refrigerant outflow port 14a for discharging the gas-phase refrigerant excluding the lubricant. The intermediate-pressure port 11b of the compressor 11 is connected to the gas-phase refrigerant outflow port 14a through the intermediate-pressure refrigerant passage 15. An intermediate-pressure side on-off valve 16a is disposed in the intermediate-pressure refrigerant passage 15. The intermediate-pressure side on-off valve 16a is an electromagnetic valve that opens and closes the intermediate-pressure refrigerant passage 15, and the operation of the intermediate-pressure side on-off valve 16a is controlled according to a control signal output from the electronic control unit 40.

The intermediate-pressure side on-off valve 16a also functions as a check valve that allows the refrigerant to only flow from the gas-phase refrigerant outflow port 14a of the gas-liquid separator 14 to the intermediate-pressure port 11b side of the compressor 11 when the intermediate-pressure refrigerant passage 15 is opened. This prevents the refrigerant from flowing backward from the compressor 11 side to the gas-liquid separator 14 when the intermediate-pressure side on-off valve 16a opens the intermediate-pressure refrigerant passage 15. The intermediate-pressure side on-off valve 16a performs a function of switching the cycle configuration (that is, the refrigerant flow channel) by opening and closing the intermediate-pressure refrigerant passage 15.

On the other hand, the gas-liquid separator 14 is provided with a liquid-phase refrigerant outflow port 14c from which the remaining refrigerant liquid-phase refrigerant including the lubricant flows out. The liquid-phase refrigerant outflow port 14c of the gas-liquid separator 14 is connected with an inlet side of a low-stage side pressure reducing portion capable of reducing a pressure of the remaining refrigerant liquid-phase refrigerant including the lubricant, and an outlet side of the low-stage side pressure reducing portion is connected with an inlet side of an exterior heat exchanger 20.

The low-stage side pressure reducing portion according to the present embodiment is configured to include a low-stage side fixed throttle 17, a fixed throttle bypass passage 18, and a low-pressure side on-off valve 16b. The low-stage side fixed throttle 17 reduces the pressure of the refrigerant flowing out of the liquid-phase refrigerant outflow port 14c of the gas-liquid separator 14 to a low-pressure refrigerant. The fixed throttle bypass passage 18 guides the refrigerant flowing out from the liquid-phase refrigerant outflow port 14c of the gas-liquid separator 14 to the exterior heat exchanger 20 side by bypassing the low-stage side fixed throttle 17. The low-pressure side on-off valve 16b is a passage on-off valve that opens and closes the fixed throttle bypass passage 18.

A basic configuration of the low-pressure side on-off valve 16b is equivalent to that of the intermediate-pressure side on-off valve 16a, and is an electromagnetic valve whose opening and closing operation is controlled according to a control signal output from the electronic control unit 40.

In this example, a pressure loss generated when the refrigerant passes through the low-pressure side on-off valve 16b is extremely small with respect to the pressure loss generated when the refrigerant passes through the low-stage side fixed throttle 17. Therefore, the refrigerant that has flowed out from the interior condenser 12 flows into the exterior heat exchanger 20 through the fixed throttle bypassing passage 18 side when the low-pressure side on-off valve 16a is opened, and flows into the exterior heat exchanger 20 through the low-stage side fixed throttle 17 when the low-pressure side on-off valve 16b is closed.

As a result, the low-stage side pressure reducing portion can be changed to a throttled state in which the pressure reducing action is exerted and a fully opened state in which the pressure reducing action is not exerted by opening and closing the low-pressure side on-off valve 16b.

As the low-pressure side on-off valve 16b, an electric three-way valve or the like may be employed. The three-way valve switches between a refrigerant circuit that connects the outlet side of the liquid-phase refrigerant outflow port 14c of the gas-liquid separator 14 and the inlet side of the low-stage side fixed throttle 17 and a refrigerant circuit that connects the outlet side of the liquid-phase refrigerant outflow port 14c and the inlet side of the fixed throttle bypassing passage 18. As the low-stage side fixed throttle 17, a nozzle, an orifice or the like with a fixed throttle opening degree can be employed.

The exterior heat exchanger 20 is disposed in an engine room of an automobile (that is, engine compartment), and exchanges a heat between the low-pressure refrigerant flowing internally and an outside air blown from a blower fan 21. The exterior heat exchanger 20 is a heat exchanger that functions as an evaporator configured to exert a heat absorbing action from the outside air by evaporating the low-pressure refrigerant at the time of executing the heating mode to be described later and functions as a radiator configured to radiate a heat of the high-pressure refrigerant to the outside air in the cooling mode.

An outlet side of the exterior heat exchanger 20 is connected with an inlet side of a cooling expansion valve 22 through a check valve 9. The cooling expansion valve 22 reduces the pressure of the refrigerant that flows from the outlet of the exterior heat exchanger 20 into an inlet of the interior evaporator 23 at the time of implementing the cooling mode. The cooling expansion valve 22 is an electric variable throttle mechanism configured similarly to the high-stage side expansion valve 13.

The cooling expansion valve 22 is configured so as to be put into a throttle state in which the pressure reducing action of the refrigerant is exerted, a fully opened state in which the pressure reducing action of the refrigerant is not exerted, and a fully closed state in which the throttle opening degree is fully closed. The throttle opening degree is the opening degree of the refrigerant flow channel between the outlet of the exterior heat exchanger 20 and the inlet of the interior evaporator 23. The operation of the cooling expansion valve 22 is controlled according to a control signal that is output from the electronic control unit 40.

The check valve 9 prevents the refrigerant from flowing from the inlet side of the cooling expansion valve 22 to the outlet side of the exterior heat exchanger 20.

The outlet side of the cooling expansion valve 22 is connected to the inlet 23a side of the interior evaporator 23. The interior evaporator 23 is disposed in the air flow upstream side of the interior condenser 12 along a vehicle interior blown air flow in the casing 31 of the interior air conditioning unit 30. The interior evaporator 23 is an evaporator that cools the vehicle interior blown air while evaporating the refrigerant flowing in the interior evaporator 23 to exert the heat absorbing action in the cooling mode, and the first and second dehumidification modes.

An inlet side of an accumulator 24 is connected to an outlet 23b side of the interior evaporator 23 through a fixed throttle valve 8 and a refrigerant flow channel 51. The fixed throttle valve 8 reduces the pressure of the refrigerant flowing from the outlet 23b of the interior evaporator 23 to the inlet side of the accumulator 24 through the refrigerant flow channel 51.

The accumulator 24 separates the refrigerant that has flowed into the inside of the accumulator 24 into the gas-phase refrigerant and the liquid-phase refrigerant and accumulates the liquid-phase refrigerant as an excessive refrigerant. Further, the gas-phase refrigerant outlet of the accumulator 24 is connected to the intake port 11a of the compressor 11. Therefore, the accumulator 24 is connected so as to allow the gas-phase refrigerant to flow out to the intake port 11a side of the compressor 11.

An outlet side of the exterior heat exchanger 20 is connected with an expansion valve bypass passage 25 for leading the refrigerant that has flowed out of the exterior heat exchanger 20 to an inlet side of the accumulator 24 while bypassing the cooling expansion valve 22 and the interior evaporator 23. The outlet 25a of the expansion valve bypass passage 25 is connected to the refrigerant flow channel 51. A cooling on-off valve 16c for opening and closing the expansion valve bypass passage 25 is disposed in the expansion valve bypass passage 25. The refrigerant flow channel 51 is a refrigerant flow channel that connects between the outlet 23b of the interior evaporator 23 and the inlet of the accumulator 24.

A basic configuration of the cooling on-off valve 16c is the same as the intermediate-pressure side on-off valve 16a, which is an electromagnetic valve whose opening and closing operation is controlled according a control signal output from the electronic control unit 40. In addition, a pressure loss occurring when the refrigerant passes through the cooling on-off valve 16c is extremely small as compared with a pressure loss occurring when the refrigerant passes through the cooling expansion valve 22. Therefore, the refrigerant that has flowed out of the exterior heat exchanger 20 flows into the accumulator 24 through the expansion valve bypass passage 25 when the cooling on-off valve 16c is open.

According to the present embodiment, a bypass passage 50 is provided which bypasses the high-stage side expansion valve 13, the low-stage side fixed throttle 17, the fixed throttle bypass passage 18, the low-pressure side on-off valve 16b, and the exterior heat exchanger 20 and connects the inlet of the cooling expansion valve 22 and the outlet 12b of the interior condenser 12.

Specifically, an inlet 50a of the bypass passage 50 is connected between the outlet 12b of the interior condenser 12 and the inlet of the high-stage side expansion valve 13. An outlet 50b of the bypass passage 50 is connected between the outlet of the check valve 9 and the inlet of the cooling expansion valve 22.

A bypass on-off valve 60 is disposed between the inlet 50a and the outlet 50b of the bypass passage 50. The bypass on-off valve 60 is an electromagnetic valve that opens and closes the bypass passage 50, and the operation of the bypass on-off valve 60 is controlled according to a control signal output from the electronic control unit 40.

The fixed throttle valve 8 is connected between the outlet 25a of the expansion valve bypass passage 25 and the outlet 23b of the interior evaporator 23 in the refrigerant flow channel 51. The fixed throttle valve 8 reduces the pressure of the refrigerant flowing from the outlet 23b of the interior evaporator 23 to the inlet of the accumulator 24.

Next, the interior air conditioning unit 30 will be described with reference to FIG. 1.

First, the vehicle interior air conditioning unit 30 is disposed inside of an instrument panel at a foremost portion of the vehicle compartment (that is, the instrument panel) to form an outer shell of the vehicle interior air conditioning unit 30, and internally includes the casing 31 that defines an air passage of the vehicle interior blown air to be blown into the vehicle compartment. The air passage accommodates a blower 32, the interior condenser 12, the interior evaporator 23 which are described above, and the like.

An inside-outside air switch device 33 is disposed on the most upstream side of the casing 31 in the air flow. The inside-outside air switch device 33 includes an inside air introduction port 33a for introducing the vehicle interior air into the casing 31, an outside air introduction port 33b for introducing the outside air into the casing 31, and an inside-outside air switch door 33c for opening and closing the introduction ports 33a and 33b by rotation. The inside-outside air switch device 33 continuously adjusts an opening area of the inside air introduction port 33a and an opening area of the outside air introduction port 33b by the inside-outside air switch door 33c, and continuously changes an air volume ratio of an inside air volume and an outside air volume. The inside-outside air switch door 33c is driven by a servomotor 33d to rotate.

The blower 32 that blows the air drawn through the inside-outside air switch device 33 toward the vehicle compartment as indicated by an arrow K is disposed in the air flow downstream side of the inside-outside air switch device 33 along the air flow. The blower 32 is an electric blower that drives a centrifugal multi-blade fan (for example, sirocco fan) with an electric motor, and the rotation speed and the blowing air volume of the blower 32 are controlled according to a control signal that is output from the electronic control unit 40.

The interior evaporator 23 and the interior condenser 12 described above are disposed on the air flow downstream side of the blower 32 in the stated order of the interior evaporator 23 and the interior condenser 12 along the flow of the vehicle interior blown air. In other words, the interior evaporator 23 is disposed on the air flow upstream side of the interior condenser 12 along the air flow.

A bypass passage 35 that bypasses the interior condenser 12 and blows the blown air that has passed through the interior evaporator 23 is provided in the casing 31. An air mixing door 34 is disposed on the air flow downstream side of the interior evaporator 23 and on the air flow upstream side of the interior condenser 12.

The air mixing door 34 adjusts the air volume ratio between the air volume passing through the interior condenser 12 and the air volume passing through the bypass passage 35 in the blown air that has passed through the interior evaporator 23 by the rotation of the air mixing door 34 to adjust a heat exchange capability of the interior condenser 12. The air mixing door 34 is driven by a servomotor 34a whose operation is controlled according to a control signal output from the electronic control unit 40.

A merging space in which the vehicle interior blown air heated by heat exchange with the refrigerant in the interior condenser 12 and the interior blown air not heated by passing through the bypass passage 35 are merged with each other is provided on the air flow downstream side of the interior condenser 12 and the bypass passage 35.

Opening portions for blowing out the blown air merged in the merging space into the vehicle compartment as a space to be air conditioned are provided in a most downstream portion of the casing 31 along the air flow. Specifically, the openings include a defroster opening portion 37a for blowing an air conditioning wind toward an inside surface of a vehicle front window glass, a face opening portion 37b for blowing the conditioned air toward an upper half of an occupant in the vehicle compartment, and a foot opening portion 37c for blowing the conditioned air toward an occupant's feet.

The air mixing door 34 adjusts the air volume ratio between the air volume allowed to pass through the interior condenser 12 and the air volume allowed to pass through the bypass passage, to thereby adjust a temperature of the blown air in the merging space 36.

Further, a defroster door 38a, a face door 38b, and a foot door 38c are disposed on the air flow upstream side of the defroster opening portion 37a, the face opening portion 37b, and the foot opening portion 37c, respectively. The defroster door 38a adjusts the opening area of the defroster opening portion 37a. The face door 38b adjusts the opening area of the face opening portion 37b. The foot door 38c adjusts the opening area of the foot opening portion 37c.

The defroster door 38a, the face door 38b, and the foot door 38c configure an opening mode switching unit for switching an opening mode. The defroster door 38a, the face door 38b, and the foot door 38c are driven by a servomotor 38d (not shown) whose operation is controlled according to a control signal output from the electronic control unit 40 through a link mechanism or the like.

The air flow downstream sides of the defroster opening portion 37a, the face opening portion 37b, and the foot opening portion 37c are connected to a face blowing port, a foot blowing port, and a defroster blowing port provided in the vehicle compartment through ducts forming air passages, respectively.

Figure 2:
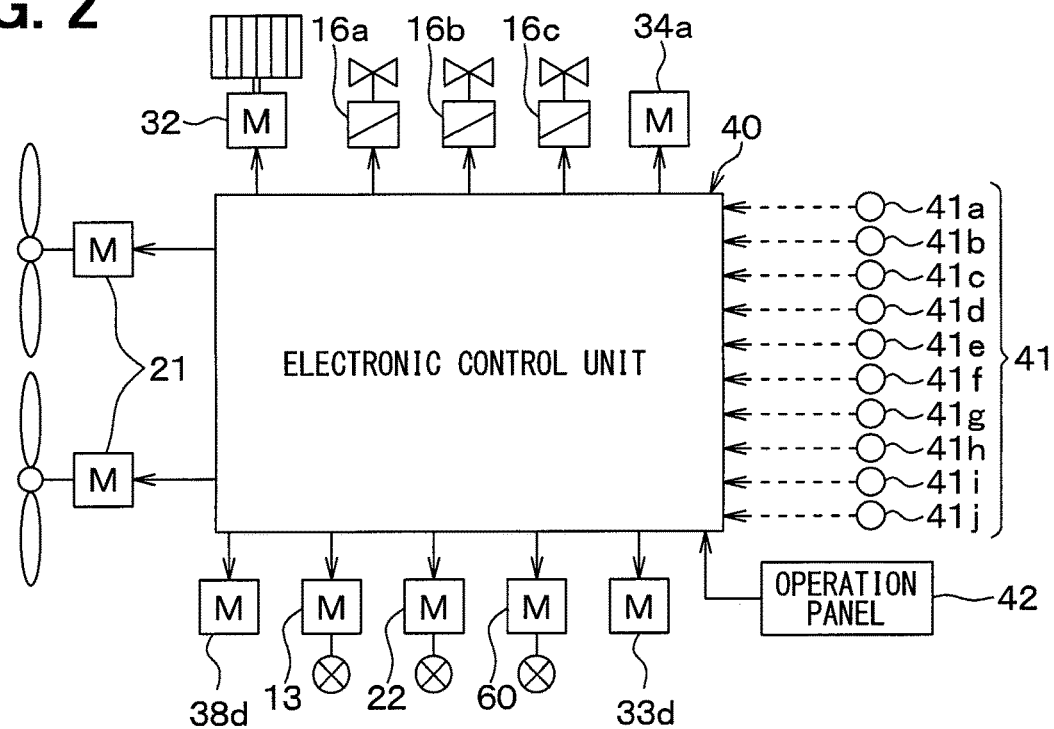
FIG. 2 is a diagram showing an electrical configuration of the heat pump cycle of FIG. 1.

Next, the electric control unit according to the present embodiment will be described with reference to FIG. 2.

The electronic control unit 40 includes a microcomputer that includes a CPU, a ROM, a RAM, and the like, as well as peripheral circuits. The electronic control unit 40 of the present disclosure is not limited to a single physical CPU, and may be implemented as one or more processors. For instance, a plurality of processors may be combined to cooperatively perform the various processing described later. In addition, one or more functions of the electronic control unit 40 may be implemented as equivalent hardware logic, and such hardware logic is intended to be included when referring to the one of more processors of the electronic control unit 40. The electronic control unit 40 performs various types of calculations and processes based on an air conditioning control program stored in the ROM (first storage unit, second storage unit, and third storage unit) and controls the operation of various air-conditioning control devices connected to the output side. The various air-conditioning control devices include a compressor 11, a high-stage side expansion valve 13, an intermediate-pressure side on-off valve 16a, a low-pressure side on-off valve 16b, a cooling on-off valve 16c, a cooling expansion valve 22, a bypass on-off valve 60, a blower 32, servomotors 34a, 33d, and the like. The ROM and RAM are non-transitory tangible storage media.

A sensor group 41 for air conditioning control is connected to the input side of the electronic control unit 40. The sensor group 41 includes an inside air sensor 41a, an outside air sensor 41b, an insolation sensor 41j, an evaporator temperature sensor 41d, refrigerant pressure sensors 41f and 41h, refrigerant temperature sensors 41c, 41e, 41g, 41i, and the like.

The inside air sensor 41a detects the vehicle interior temperature. The outside air sensor 41b detects the outside air temperature. The insolation sensor 41j detects the amount of insolation in the vehicle compartment. The evaporator temperature sensor 41d detects the temperature of the air blown out from the interior evaporator 23.

The refrigerant temperature sensor 41c detects the temperature of the refrigerant flowing out of the interior evaporator 23. The refrigerant temperature sensor 41e detects the temperature of the high-pressure refrigerant flowing between the discharge port 11c of the compressor 11 and the inlet 12a of the interior condenser 12. The refrigerant pressure sensor 41f detects the pressure of the refrigerant flowing between the outlet 12b of the interior condenser 12 and the inlet of the high-stage side expansion valve 13. The refrigerant pressure sensor 41h detects the pressure of the refrigerant flowing from the outlet of the exterior heat exchanger 20 to the expansion valve bypass passage 25 or the cooling expansion valve 22.

The refrigerant temperature sensor 41g detects the temperature of the refrigerant flowing between the outlet 12b of the interior condenser 12 and the inlet of the high-stage side expansion valve 13. The refrigerant temperature sensor 41i detects the temperature of the refrigerant flowing from the outlet of the exterior heat exchanger 20 to the expansion valve bypass passage 25 or the cooling expansion valve 22.

Furthermore, an operation panel 42, which is disposed in the vicinity of an instrument panel positioned at the front portion in the vehicle compartment, is connected to the input side of the electronic control unit 40, and operation signals output from various air conditioning operation switches mounted on the operation panel 42 are input to the input side of the electronic control unit 40. As the various air conditioning operation switches provided on the operation panel, specifically, a start switch of the vehicle air conditioner 1 and a vehicle interior temperature setting switch for setting a set temperature Test as a target temperature of the vehicle interior temperature are provided. The various types of air conditioning operation switches provided on the operation panel are further provided with an operation selection switch for selecting the cooling mode, the heating mode, the dehumidification mode, and the like.

The electronic control unit 40 is integrated with control units for controlling the operation of various air-conditioning control devices that is connected to the output side of the electronic control unit 40. A configuration for controlling the operation of each type of the control target device configures the control unit for controlling the operation of each type of the control target device. The above configuration may be hardware or software.

For example, according to the present embodiment, a configuration which controls the operation of the electric motor of the compressor 11, configures a discharge capacity control unit. The above configuration may be hardware or software. A configuration for controlling the operation of the refrigerant flow channel switching units 16a to 16c configures a refrigerant flow channel control unit. The above configuration may be hardware or software. It is needless to say that the discharge capacity control unit and the refrigerant flow channel control unit may be configured as separate control devices for the electronic control unit 40.

Figure 3:
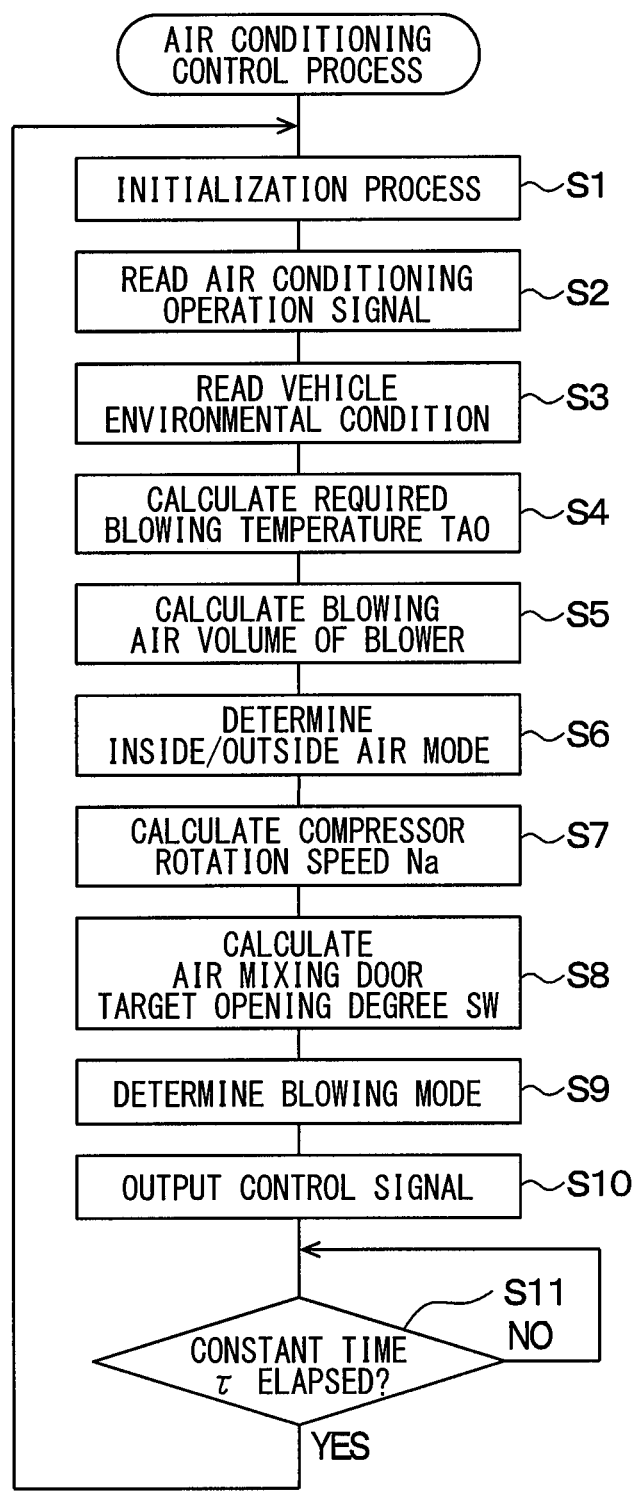
FIG. 3 is a flowchart showing a part of a control process of the electronic control unit in FIG. 2.

Next, the operation of the vehicle air conditioner 1 according to the present embodiment in the above configuration will be described. FIG. 3 is a flowchart showing an air conditioning control process of the electronic control unit 40. The electronic control unit 40 executes the air conditioning control process according to the flowchart of FIG. 3.

First, the electronic control unit 40 determines an operation mode to be executed among the cooling mode, the heating mode, and the first and second dehumidification heating modes based on the detected temperature of the outside air sensor 41b, the set temperature Tes, and the like, and executes the determined operation mode.

Hereinafter, outlines of the cooling mode, the heating mode, and the first and second dehumidification heating modes will be described.

(Cooling Mode)

In the cooling mode, the electronic control unit 40 places the high-stage side expansion valve 13 in a fully opened state in which the pressure reducing action is not exerted, places the cooling expansion valve 22 in a throttled state in which the pressure reducing action is exerted, and places the cooling on-off valve 16c in a valve close state.

Further, the electronic control unit 40 opens the low-pressure side on-off valve 16b and sets the low-stage side pressure reducing portion to a fully opened state in which the pressure reducing action is not exerted. Further, the electronic control unit 40 brings the intermediate-pressure side on-off valve 16a into the valve close state in conjunction with the state of the low-pressure side on-off valve 16b. Further, the electronic control unit 40 closes the bypass passage 50 by closing the bypass on-off valve 60.

Therefore, in the heat pump cycle 10 in the cooling mode, the high-pressure refrigerant discharged from the discharge port 11c of the compressor 11 flows into the interior condenser 12. At that time, since the air mixing door 34 closes the air passage of the interior condenser 12, almost all of the refrigerant flowing into the interior condenser 12 flows out of the interior condenser 12 without radiating a heat to the vehicle interior blown air.

The refrigerant that has flowed out of the interior condenser 12 flows into the high-stage side expansion valve 13, the gas-liquid separator 14, and the low-pressure side on-off valve 16b in the stated order, and flows into the exterior heat exchanger 20. The gas-phase refrigerant that has flowed into the exterior heat exchanger 20 exchanges a heat with the outside air blown from the blower fan 21 and radiates the heat.

The refrigerant that has flowed out of the exterior heat exchanger 20 flows into the cooling expansion valve 22 through the check valve 9 because the cooling on-off valve 16c is in the valve closed state. For that reason, the refrigerant flowing out of the exterior heat exchanger 20 is reduced in pressure and expanded in an isenthalpic manner until the refrigerant becomes the low-pressure refrigerant by the cooling expansion valve 22. The low-pressure refrigerant reduced in pressure by the cooling expansion valve 22 flows into the interior evaporator 23, absorbs the heat from the interior blown air blown from the blower 32, and evaporates. As a result, the vehicle interior blown air is cooled.

The refrigerant that has flowed out of the interior evaporator 23 flows into the accumulator 24 through the fixed throttle valve 8 and is separated into the gas-phase refrigerant and the liquid-phase refrigerant by the accumulator 24. Then, the separated gas-phase refrigerant is drawn from the intake port 11a of the compressor 11 and again compressed in the stated order in the low-stage side compression mechanism and the high-stage side compression mechanism. On the other hand, the separated liquid-phase refrigerant is stored in the accumulator 24 as excess refrigerant which is not necessary for the cycle to exhibit the required refrigeration capacity.

(First Dehumidification Heating Mode)

Next, the first dehumidifying and heating will be described.

When executing the first dehumidifying and heating, the electronic control unit 40 controls the high-stage side expansion valve 13, the cooling expansion valve 22, the intermediate-pressure side on-off valve 16a, the cooling on-off valve 16c, the low-pressure side on-off valve 16b, and the bypass on-off valve 60, similarly to the cooling mode.

For that reason, similarly to the cooling mode, the refrigerant flows through the compressor 11, the interior condenser 12, the high-stage side expansion valve 13, the gas-liquid separator 14, the low-pressure side on-off valve 16b, the exterior heat exchanger 20, the check valve 9, the cooling expansion valve 22, the fixed throttle valve 8, the accumulator 24, and the compressor 11 in a stated order.

At that time, the temperature of the air blown out from the opening portions 37a, 37b, and 37c into the interior is adjusted by adjusting a ratio of an air volume flowing into the interior condenser 12 to an air volume flowing into the bypass passage 35 in the cold air blown from the interior evaporator 23 according to the opening degree of the air mixing door 34.

(Second Dehumidification Heating Mode)

In the second dehumidification heating mode, the electronic control unit 40 brings the high-stage side expansion valve 13 into a fully closed state, and brings the cooling expansion valve 22 into a throttled state in which the pressure reducing action is exerted.

Therefore, in the heat pump cycle 10 in the second dehumidification heating mode, the high-pressure refrigerant discharged from the discharge port 11c of the compressor 11 flows into the interior condenser 12. At that time, the refrigerant flowing into the interior condenser 12 radiates a heat to the vehicle interior blown air and flows out of the interior condenser 12.

The refrigerant that has flowed out of the interior condenser 12 flows to the cooling expansion valve 22 through the bypass passage 50 and the bypass on-off valve 60. The low-pressure refrigerant decompressed by the cooling expansion valve 22 flows into the interior evaporator 23, absorbs the heat from the interior blown air blown from the blower 32, and evaporates. As a result, the vehicle interior blown air is cooled.

The refrigerant that has flowed out of the interior evaporator 23 flows into the accumulator 24 through the fixed throttle valve 8 and is separated into the gas-phase refrigerant and the liquid-phase refrigerant by the accumulator 24. Then, the separated gas-phase refrigerant is drawn from the intake port 11a of the compressor 11 and again compressed in the stated order in the low-stage side compression mechanism and the high-stage side compression mechanism.

At that time, the temperature of the air blown out from the opening portions 37a, 37b, and 37c into the interior is adjusted by adjusting a ratio of an air volume flowing into the interior condenser 12 to an air volume flowing into the bypass passage 35 in the cold air blown from the interior evaporator 23 according to the opening degree of the air mixing door 34.

(Heating Mode)

Next, the heating mode will be described with reference to.

The electronic control unit 40 controls a rotation speed Na of the electric motor of the compressor 11 (that is, the refrigerant discharge capacity of the compressor 11) based on the required blowing temperature TAO.

For example, the control signal for controlling the electric motor of the compressor 11 is determined by feedback control so that an estimated blowing temperature TAV approaches a required blowing temperature TAO based on a deviation between the estimated blowing temperature TAV and the required blowing temperature TAO.

The estimated blowing temperature TAV is an estimation value of the air temperature blown out from the interior condenser 12. The estimated blowing temperature TAV is obtained from an evaporator temperature Te, which is a detection value of the evaporator temperature sensor 41*d*, the blowing air volume of the blower 32, and the detected temperature of the refrigerant temperature sensor 41*g*.

The electronic control unit 40 controls the throttle opening degree in the high-stage side expansion valve 13 to set the high-stage side expansion valve 13 in the throttle state for exerting the pressure reducing action of the refrigerant. The throttle opening degree of the high-stage side expansion valve 13 is set such that the degree of supercooling of the refrigerant flowing from the interior condenser 12 to the high-stage side expansion valve 13 comes closer to a target degree of subcooling determined in advance so as to bring the COP closer to a substantially maximum value.

This makes it possible for the refrigerant in the interior condenser 12 to exert the heating capacity for heating the vehicle interior blown air.

In this example, the degree of subcooling is calculated based on the detected pressure of the refrigerant pressure sensor 41*f* and the detected temperature of the refrigerant temperature sensor 41*g*.

The electronic control unit 40 brings the bypass on-off valve 60 into a fully closed state to close the bypass passage 50, brings the cooling expansion valve 22 into a fully closed state, brings the cooling on-off valve 16*c* into a valve open state, brings the low-pressure side on-off valve 16*b* into a valve close state, and brings the low-stage side pressure reducing portion into a throttled state to exert a pressure reducing action.

The electronic control unit 40 sets the intermediate-pressure side on-off valve 16*a* to the valve open state in conjunction with the state of the low-pressure side on-off valve 16*b*. The electronic control unit 40 controls the bypass on-off valve 60 to close the bypass passage 50. As a result, the heat pump cycle 10 is switched to the refrigerant flow channel in which the refrigerant flows as indicated by thick arrows in FIG. 1.

Further, a control signal for controlling a servomotor of the air mixing door 34 is determined so that the air mixing door 34 closes the bypass passage 35 and a total flow rate of the blown air that has passed through the interior evaporator 23 passes through the interior condenser 12.

Therefore, in the heat pump cycle 10 in the heating mode, the high-pressure refrigerant discharged from the discharge port 11*c* of the compressor 11 flows into the interior condenser 12. The refrigerant that has flowed into the interior condenser 12 exchanges a heat with the vehicle interior blown air which has been blown from the blower 32 and passed through the interior evaporator 23, and radiates the heat. As a result, the vehicle interior blown air is heated.

In this situation, the refrigerant that has flowed from the interior condenser 12 is isenthalpically reduced in pressure and expanded by the high-stage side expansion valve 13 that is in the throttle state until the refrigerant reaches the intermediate-pressure refrigerant. The intermediate-pressure refrigerant whose pressure has been reduced by the high-stage side expansion valve 13 is separated into a gas-phase refrigerant from which a lubricant has been removed and a liquid-phase refrigerant containing the lubricant in the gas-liquid separator 14.

The gas-phase refrigerant separated by the gas-liquid separator 14 (that is, the gas-phase refrigerant from which the lubricant has been removed) flows into the intermediate-pressure port 11*b* of the compressor 11 through the intermediate-pressure refrigerant passage 15, merges with the low-stage side compression mechanism discharged refrigerant, and is suctioned into the high-stage side compression mechanism. This is because the intermediate-pressure side on-off valve 16*a* is in the valve open state.

On the other hand, the liquid-phase refrigerant including the lubricant separated by the gas-liquid separator 14 is reduced in pressure into the low-pressure refrigerant by the low-stage side pressure reducing portion since the low-stage side pressure reducing portion is in the throttle state, and flows into the exterior heat exchanger 20. In other words, in the low-stage side pressure reducing portion, since the low-pressure side on-off valve 16*b* is in the valve close state, the refrigerant is isenthalpically reduced in pressure and expanded until the refrigerant flows into the low-stage side fixed throttle 17 and becomes the low-pressure refrigerant. The refrigerant that has flowed out of the low-stage side fixed throttle 17 flows into the exterior heat exchanger 20 and exchanges a heat with the outside air blown from the blower fan 21 to absorb the heat.

The refrigerant that has flowed out of the exterior heat exchanger 20 flows into the accumulator 24 through the expansion valve bypass passage 25 and is separated into gas and liquid because the cooling on-off valve 16*c* is in the valve open state. Then, the separated gas-phase refrigerant is suctioned from the intake port 11*a* of the compressor 11 and compressed again. On the other hand, the separated liquid-phase refrigerant is stored in the accumulator 24 as excess refrigerant which is not necessary for the cycle to exhibit the required refrigeration capacity.

As described above, in the heating mode, the heat of the refrigerant discharged from the compressor 11 by the interior condenser 12 is radiated to the vehicle interior blown air, and the heated interior blown air can be blown out into the vehicle compartment. As a result, heating of the vehicle compartment can be realized.

Furthermore, in the heating mode, the low-pressure refrigerant whose pressure has been reduced by the low-stage side fixed throttle 17 is drawn from the intake port 11*a* of the compressor 11, and the intermediate-pressure refrigerant whose pressure has been reduced by the high-stage side expansion valve 13 flows into the intermediate-pressure port 11*b* so as to merge with the refrigerant in a pressure increasing process. That is, a gas injection cycle, i.e., an economizer In other words, a gas injection cycle (that is, an economizer type refrigeration cycle) can be configured.

Therefore, the compression efficiency of the high-stage side compression mechanism can be improved by causing the high-stage side compression mechanism to suction the mixture refrigerant having a low temperature. At the same time, a pressure difference between the intake refrigerant pressure and the discharged refrigerant pressure in both the low-stage side compression mechanism and the high-stage side compression mechanism is reduced, thereby being capable of improving the compression efficiency of both the compression mechanisms. As a result, the COP of the entire heat pump cycle 10 can be improved.

As is apparent from the above description, in the heating mode, the refrigerant circuit is formed. In the refrigerant circuit, the refrigerant that has flowed out of the interior condenser 12 flows into the high-stage side expansion valve 13 that is in the throttle state, the gas-liquid separator 14, the low-stage side pressure reducing portion that is in the throttle state, the exterior heat exchanger 20, the cooling on-off valve 16*c*, the accumulator 24, the compressor 11, and the interior condenser 12 in the stated order. In the refrigerant circuit, the gas-phase refrigerant separated by the gas-liquid separator 14 flows from the intermediate-pressure refrigerant passage 15 into the intermediate-pressure port 11*b* of the compressor 11.

Next, the operation in the heating mode, which is a feature of the present embodiment, will be described. FIG. 3 is a flowchart showing the air conditioning control process of the electronic control unit 40. The electronic control unit 40 executes the air conditioning control process according to the flowchart of FIG. 3. The execution of the air conditioning control process is started when an ignition switch IG is turned on.

First, in Step S1, a timer is initialized to start counting by the timer. The timer is a timer for measuring a time elapsed from the start of the processing of next Step S2.

In the next Step S2, the air conditioning operation signal of each air conditioning operation switch of the operation panel 42 is read. In next Step S3, detection signals output from the sensors 41a, 41b, 41c, 41d, 41e, 41f, 41h, 41g, and 41i are read.

Next, in Step S4 (that is, a second temperature calculation unit), the required blowing temperature TAO of the air conditioning wind blown into the vehicle compartment is calculated. The required blowing temperature TAO is a blowing temperature necessary for maintaining the temperature in the vehicle compartment at the set temperature Tset of the vehicle interior temperature setting switch, and is calculated based on Expression 1 below.

$$TAO=Kset \times Tset-Kr \times Tr-Kam \times Tam-Ks \times Ts+C \qquad \text{(Ex. 1)}$$

Tr: the inside air temperature detected by the inside air sensor 41a

Tam: the outside air temperature detected by the outside air sensor 41b

Ts: the amount of insolation detected by the insolation sensor 41j

Kset, Kr, Kam, Ks: control gain

C: Correction constant

Next, in Step S5, a target value (that is, target blowing air volume) of the blowing air volume blown by the blower 32, that is, the target blowing air volume, specifically, a blower voltage Ve, which is an applied voltage to the motor 6b for driving the blower, is determined based on the required blowing temperature TAO. A method of determining the target blowing air volume of the blower 32 will be described later.

Next, in Step S6, the inside/outside air mode is determined. For example, as the required blowing temperature TAO rises from the low temperature side to the high temperature side, switching from the inside air mode to the inside and outside air mixing mode and switching from the inside-outside air mixing mode to the outside air mode are determined. In order to execute the inside/outside air mode determined in this manner, the inside-outside air switch door 33c is driven by controlling the servomotor 33d.

Next, in Step S7, the control signal for controlling the electric motor of the compressor 11 is determined by feedback control so that an estimated blowing temperature TAV approaches a required blowing temperature TAO based on a deviation between the estimated blowing temperature TAV and the required blowing temperature TAO.

Next, in Step S8, a target opening degree SW of the air mixing door 34 is calculated. In the heating mode, the target opening degree SW of the air mixing door 34 is set to the maximum heating position at which the bypass passage 35 is fully opened and the air inlet of the interior condenser 12 is fully opened.

Next, in Step S9, the blowing mode is determined in accordance with the required blowing temperature TAO. The blowing mode is switched from the face mode to the bi-level mode and from the bi-level mode to the foot mode as the required blowing temperature TAO rises from the low temperature side to the high temperature side.

Next, in Step S10 (that is, the control unit), the control signals indicating the blower voltage Ve, the inside/outside air mode, the rotation speed Na of the compressor 11, the target opening degree SW of the air mixing door 34, and the blowing mode, which are determined as described above, are output to the respective electric actuators of the electric motor of the compressor 11, the blower 32, and the servomotors 34a and 33d.

In next Step S11, it is determined whether or not the time measured by the timer (hereinafter referred to as the measurement time of the timer) has reached a predetermined time T. The fixed time T is a time indicating a control cycle in which the processes of Steps S2, S3, S4, S5, S6, S7, S8, S9, and S10 are performed. When the measurement time of the timer is shorter than the predetermined time T, the determination of NO is made in Step S11, and the determination in Step S11 is performed.

For that reason, the determination in Step S10 is repeated until the measurement time of the timer reaches the fixed time T. Thereafter, when the measurement time of the timer reaches the fixed time T, the determination of YES is made in Step S11, and the process returns to Step S1 to initialize the timer and start counting by the timer.

As a result, the electronic control unit 40 controls the rotation speed Na of the electric motor of the compressor 11 by feedback control so that the estimated blowing temperature TAV approaches the required blowing temperature TAO. In other words, the electronic control unit 40 controls the rotation speed Na of the electric motor of the compressor 11 to raise the temperature of the high-pressure refrigerant discharged from the compressor 11 to reach the target temperature, thereby performing warm-up. The target temperature of the temperature of the high-pressure refrigerant is determined according to the required blowing temperature TAO.

The electronic control unit 40 controls the blower 32 to bring the air volume blown from the blower 32 closer to the target blowing air volume. The electronic control unit 40 controls the inside-outside air switch door 33c through the servomotor 33d so as to execute the inside/outside air mode determined in Step S6. The electronic control unit 40 controls the servomotor 34a so that the actual opening degree of the air mixing door 34 approaches the target opening degree SW.

Next, the details of the calculation process of the target value of the blowing air volume of the blower 32 according to the present embodiment (that is, Step S5) will be described with reference to FIG. 4.

First, in Step S20 (that is, the first temperature calculation unit), the estimated blowing temperature TAV is obtained based on the detection value of the evaporator temperature sensor 41d, the detected temperature of the refrigerant temperature sensor 41g, and the current blowing air volume (that is, blower voltage Ve) of the blower 32.

In this example, the detected temperature of the evaporator temperature sensor 41d indicates the temperature of the vehicle interior blown air that has passed through the interior evaporator 23, and the detected temperature of the refrigerant temperature sensor 41g indicates the temperature of the vehicle interior blown air that has passed through the interior condenser 12.

Next, in Step S21 (that is, the first determination unit), a candidate value f(TAV) of the target value (hereinafter, referred to as the target blowing air volume) of the blowing air volume of the blower 32 is obtained based on the air volume map Ha and the estimated blowing temperature TAV.

The air volume map Ha is a graph in which the horizontal axis represents the estimated blowing temperature TAV, the vertical axis represents the candidate value f(TAV), and the estimated blowing temperature TAV and the candidate value f(TAV) are specified in a one-to-one relationship. The air volume map Ha corresponds to a third air volume map.

In the air volume map Ha, when the estimated blowing temperature TAV is smaller than lower reference values (that is, 29, 40), the candidate value f(TAV) becomes zero, which is the minimum value. The lower reference values correspond to third lower reference values. When the estimated blowing temperature TAV is greater than upper reference values (that is, 56, 60), the candidate value f(TAV) is 31 which is the maximum value. Those upper reference values correspond to third upper reference values. When the estimated blowing temperature TAV is between the lower reference values (that is, 29, 40) and the upper reference values (that is, 56, 60), the candidate value f(TAV) gradually increases as the estimated blowing temperature TAV moves from the lower reference values (that is, 29, 40) toward the upper reference values (that is, 56, 60).

In the air volume map Ha, when the estimated blowing temperature TAV decreases and the estimated blowing temperature TAV falls within a range of 36 to 29, the candidate value f(TAV) becomes 1, and when the estimated blowing temperature TAV falls below the lower reference value 29, the candidate value f(TAV) becomes the minimum value (that is, zero). On the other hand, when the estimated blowing temperature TAV increases, a hysteresis characteristic is set in which the candidate value f(TAV) becomes larger than the minimum value (that is, zero) when the estimated blowing temperature TAV becomes equal to or larger than the lower reference value 40.

In the air volume map Ha, when the estimated blowing temperature TAV is decreasing, if the estimated blowing temperature TAV becomes equal to or smaller than the upper reference value 60, the candidate value f(TAV) becomes smaller than the maximum value (that is, 31). In the air volume map Ha, when the estimated blowing temperature TAV is increasing, the candidate value f(TAV) becomes the maximum value (that is, 31) when the estimated blowing temperature TAV becomes equal to or higher than the upper reference value 56. That is, the hysteresis characteristic is set.

In the air volume map Ha configured as described above, the candidate value f(TAV) specified in a one-to-one relationship with the estimated blowing temperature TAV is determined.

Next, in Step S22 (that is, the determination unit, the second determination unit, and the third determination unit), the candidate value f(TAO−TAV) of the target blowing air volume of the blower 32 is obtained based on the air volume map Hb and the deviation (TAO−TAV).

The air volume map Hb is a graph in which the horizontal axis represents the deviation (TAO−TAV), the vertical axis represents the candidate value f (TAO−TAV), and the deviation (TAO−TAV) and the candidate value f (TAO−TAV) are specified in a one-to-one manner. The air volume map Hb corresponds to a second air volume map.

In the air volume map Hb, when the deviation (TAO−TAV) is larger than the upper reference values (that is, 5, 100), the candidate value f(TAO−TAV) becomes zero, which is the minimum value. Those upper reference values correspond to second upper reference values. When the deviation (TAO−TAV) is equal to or greater than zero and smaller than the lower reference value 1, the candidate value f(TAO−TAV) becomes 4 which is the maximum value (that is, a predetermined value). The lower reference value corresponds to a second lower reference value.

When the deviation (TAO−TAV) is between the lower reference value (that is, 1) and the upper reference values (that is, 5, 100), the candidate value f(TAO−TAV) becomes progressively smaller as the deviation (TAO−TAV) proceeds from the lower reference value (that is, 1) to the upper reference values (that is, 5, 100).

In the air volume map Hb, when the deviation (TAO−TAV) is increasing, the candidate value f(TAO−TAV) becomes 1 when the deviation (TAO−TAV) falls within the range of 5 to 100. When the deviation (TAO−TAV) becomes equal to or larger than the upper reference value 100, the candidate value f(TAO−TAV) becomes the minimum value (that is, zero). In addition, when the deviation (TAO−TAV) is decreasing, the candidate value f(TAV) becomes larger than the minimum value (that is, zero) when the estimated blowing temperature TAV becomes equal to or higher than the upper reference value 5. That is, the hysteresis characteristic is set.

In the air volume map Hb configured as described above, the candidate value f(TAO−TAV) specified in a one-to-one relationship with respect to the deviation (TAO−TAV) is determined.

In this example, the electronic control unit 40 controls the compressor 11 to determine whether or not warm-up for raising the refrigerant temperature to reach the target temperature is in the halfway state on the basis of the deviation TAO−TAV between the estimated blowing temperature TAV and the required blowing air temperature TAO.

When the deviation (TAO−TAV) is larger than zero, the electronic control unit 40 determines that the warm-up is in the halfway state, and the candidate value f(TAO−TAV) specified in a one-to-one manner with respect to the deviation (TAO−TAV) in the air volume map Hb is determined.

On the other hand, when the deviation TAO−TAV becomes zero, the electronic control unit 40 determines that the warm-up is completed. In this instance, the electronic control unit 40 determines a predetermined value which is the maximum value (that is, 4) as the candidate value f(TAO−TAV).

In this example, the maximum value (that is, 4) of the candidate value f(TAO−TAV) of the air volume map Hb is set to a value smaller in level than the maximum value (that is, 31) of the candidate value f(TAV) of the air volume map Ha.

Next, in Step S23, the larger value (=Max(f(TAV), f(TAO−TAV))) among the candidate value f(TAV) determined in Step S21 and the candidate value f(TAO−TAV) determined in Step S22 is set as an upper limit value Va of the blowing air volume.

Next, in Step S24, the upper limit value Va of the blowing air volume determined in the above Step S23 and the upper limit value of the blowing air volume determined according to other requirements than the air volume maps Ha and Hb are arbitrated to obtain the target blowing air volume.

As described above, the target blowing air volume of the blower 32 is determined with the use of the candidate values f(TAO−TAV) and f(TAV).

Figure 4:
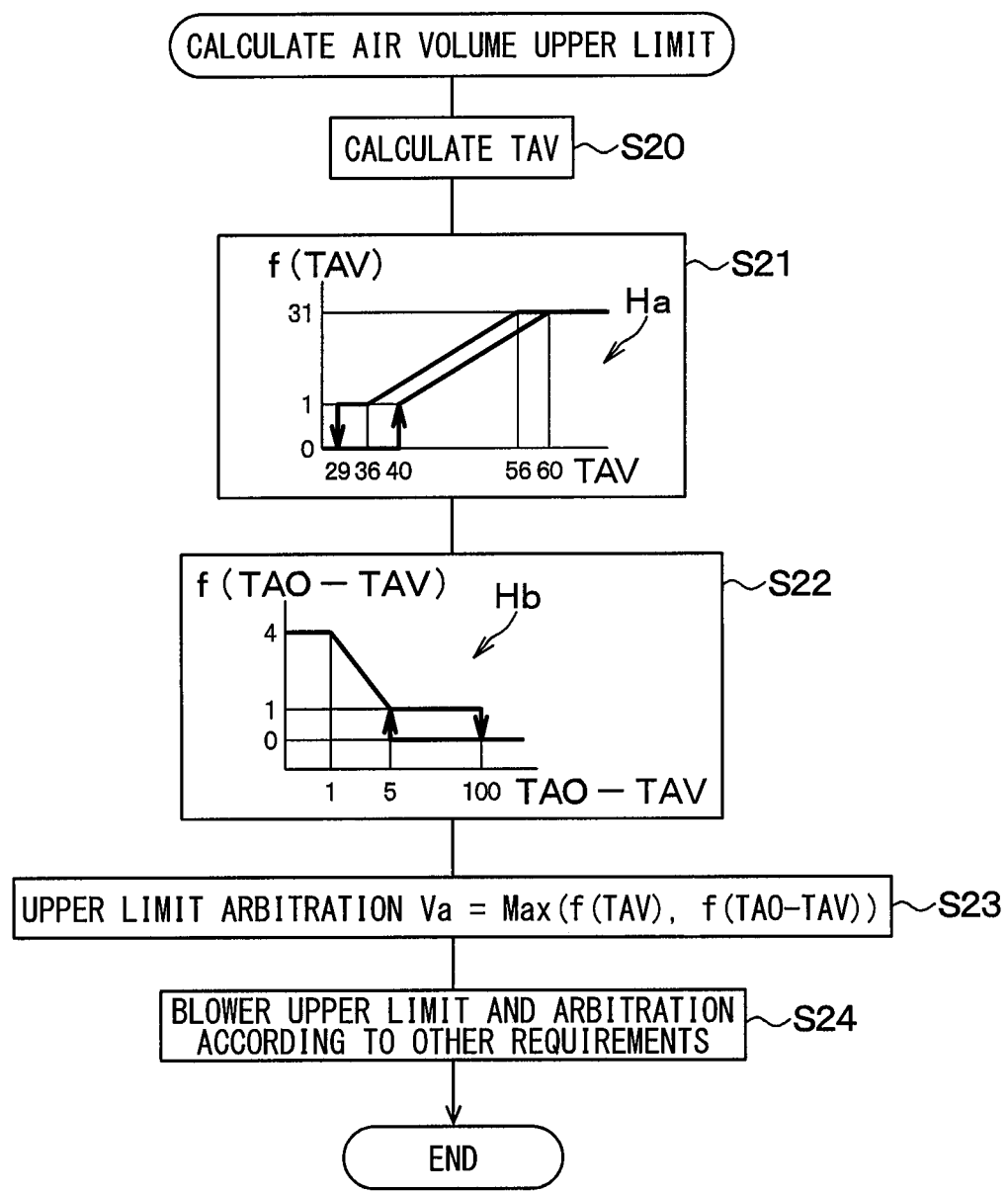
FIG. 4 is a flowchart showing a part of the control process of the electronic control unit in FIG. 2.

The units of the candidate value f(TAV) of the air volume map Ha and the candidate value f(TAO−TAV) of the air volume map Hb in FIG. 4 are levels. The level corresponds to the voltage applied to the blower 32 (that is, the blowing air volume of the blower 32), and the blowing air volume of the blower 32 is larger as the level is larger.

The electronic control unit 40 according to the present embodiment described above is applied to the vehicle air conditioner 1 including the compressor 11 for heating the refrigerant, the casing 31 for circulating the air flow toward the vehicle compartment, and the blower 32 for generating the air flow in the casing 31. The vehicle air conditioner 1 also includes the interior condenser 12 which is disposed in the casing 31 and heats the air flow by heat exchange between the refrigerant heated by the compressor 11 and the air flow.

The electronic control unit 40 includes Step S20 of determining the estimated blowing temperature TAV, which is the estimation value of the temperature of the air flow heated by the interior condenser 12. The electronic control unit 40 further includes Step S21 of determining the candidate value of the target blowing air volume of the blower 32 based on the estimated blowing temperature TAV. The electronic control unit 40 further includes Step S4 of determining the required blowing air temperature TAO, which is the air temperature required to be blown from the casing 31 into the interior in order to maintain the air temperature in the vehicle compartment at the set temperature Tset.

The electronic control unit 40 includes Steps S7 and S10 of controlling the compressor 11 to warm up the temperature of the refrigerant to reach the target temperature. The electronic control unit 40 further includes Step S22 of determining whether or not the warm-up is in the halfway state based on the deviation between the required blowing air temperature TAO and the estimated blowing temperature TAV. Further, the electronic control unit 40 includes Step S22 of determining the candidate value f(TAO−TAV) of the target blowing air volume of the blower 32 based on the deviation (TAO−TAV) between the required blowing air temperature TAO and the estimated blowing temperature TAV when it is determined that the warm-up is in the halfway state. The electronic control unit 40 further includes Step S22 of determining the predetermined value (that is, 4) as the candidate value f (TAO−TAV) of the target blowing air volume of the blower 32 when it is determined that the warm-up has been completed.

The electronic control unit 40 includes Steps S23 and S24 of determining the target blowing air volume of the blower 32 with the use of the larger candidate value of the candidate value f(TAO−TAV) determined in Step S22 and the candidate value f(TAV) determined in Step S21.

As described above, the target blowing air volume of the blower 32 can be appropriately determined.

For example, when the air conditioning load in the vehicle compartment is low and the warm-up has been completed, the deviation (TAO−TAV) becomes zero, so that the maximum value (that is, the maximum value 4) is determined as the candidate value f(TAO−TAV) based on the air volume map Hb.

For that reason, the candidate value f(TAO−TAV) is selected as the larger candidate value of the candidate value f(TAV) and the candidate value f(TAO−TAV).

Therefore, the candidate value f(TAO−TAV) and the candidate value determined by other requirements are arbitrated, and the candidate value f(TAO−TAV) is determined as the target blowing air volume of the blower 32. Then, when the warm-up has been completed, even when the air conditioning load in the vehicle compartment is small, the minimum required blowing air volume can be ensured as the blowing air volume of the blower 32.

Further, when the air conditioning load in the vehicle compartment is large and the warm-up load is in the halfway state, the deviation (TAO−TAV) becomes large (for example, 25° C.). As a result, 0 level is selected as the candidate value f(TAO−TAV).

In that case, when the estimated blowing temperature TAV rises to, for example, 45° C., the candidate value f(TAV) becomes a value of 8.5 level.

For that reason, the candidate value f(TAV) is selected as the larger candidate value MAXf of the candidate value f(TAV) and the candidate value f(TAO−TAV).

Therefore, the candidate value f(TAV) is determined as the target blowing air volume of the blower 32 by arbitrating the candidate value f(TAV) and the candidate value determined by other requirements. Then, even when the air conditioning load in the vehicle compartment is large, the blowing air volume of the blower 32 can be reduced, and the cold air can be inhibited from blowing out from the foot opening portion 37c into the vehicle compartment.

Comparative Example

In contrast to the above configuration, consider a vehicle air condition of a comparative example. In the vehicle air conditioner of the comparative example, which uses a coolant water for a travel engine as a heat medium, an air volume control is used for automatically controlling a target air volume of a blowing air volume blown from a blower to a vehicle compartment through a blowing port in accordance with a water temperature of the engine coolant water has been proposed. Specifically, the target air volume of the blower is determined with the use of a first air volume map and a second air volume map.

In the vehicle air conditioner of the comparative example, the first air volume map is an air volume map in which a blowing air volume V1 of the blower and a blowing temperature TAH at the blowing port are associated with each other in a one-to-one relationship. The second air volume map is an air volume map in which the blowing air volume V2 of the blower and a required blowing temperature TAO are associated with each other in a one-to-one relationship. The blowing temperature TAH is an air temperature blown out from the blowing port.

Further, in the vehicle air conditioner of the comparative example, the blowing air volume V1 corresponding to the blowing temperature TAH in the first air volume map and the blowing air volume V2 corresponding to the required blowing temperature TAO in the second air volume map are obtained. The smaller blowing air volume of the blowing air volumes V1 and V2 calculated in the above manner is set as a target air volume of the blowing air volume.

In this case, instead of the engine coolant water, if the air conditioner of the comparative example uses a refrigerant of a device having characteristics different from those of a travel engine, such as a heat pump that heats an air flow by the refrigerant discharged from an electric compressor or the like, the volume of air blown into a vehicle compartment cannot be optimally controlled by only the air volume control described above, and comfort may be impaired.

Specifically, in an air conditioner using a heat pump, unlike the vehicle air conditioner using the coolant water of the travel engine as a heating source as the vehicle air conditioner of the comparative example, the refrigerant temperature can be controlled by controlling the electric compressor so as to be able to adjust a heating capacity for heating the blown air according to a situation. For that reason, for example, when an air conditioning load in the vehicle compartment is small, the blowing temperature control can be performed such that the heating capacity of the blown air is reduced to decrease the air temperature blown into the vehicle compartment.

However, the present inventors have investigated that the following problem occurs when such a method for the blowing air temperature control is combined with the method of calculating the target air volume used in the vehicle air conditioner of the comparative example.

In the case where the air conditioning load in the vehicle compartment is small, when warm-up for increasing a temperature of the refrigerant to bring the refrigerant temperature closer to a target temperature is in a halfway state, the blowing temperature TAH becomes a small value. For that reason, the blowing air volume V1 determined by the first air volume map and the blowing temperature TAH is set to an extremely small air volume, and becomes lower than a minimum value of the blowing air volume V2. For that reason, the blowing air volume V1 is selected as the target air volume of the blowing air volume, the target air volume of the blowing air volume becomes an extremely small value, and the blowing air volume of the blower becomes substantially zero.

However, when the air conditioning load in the vehicle compartment is small, even if the refrigerant temperature reaches the target temperature and the warm-up is completed, a required blowing temperature TAO becomes low (for example, TAO=30° C.), and an estimated blowing temperature TAV becomes a small value. For that reason, the blowing air volume V1 is continuously set to an extremely low air volume and becomes lower than the blowing air volume V2.

In other words, when the air conditioning load in the vehicle compartment is small, even if the warm-up is completed, the target air volume of the blowing air volume in the middle of the warm-up is continued, and the blowing air volume of the blower is kept substantially zero. For that reason, the blowing air volume of the blower does not become a value corresponding to the air conditioning load in the vehicle compartment. Therefore, there is a problem that the blowing air volume cannot be appropriately controlled and the comfort is impaired.

In contrast, according to the configuration of the first embodiment of the present disclosure, an electronic control unit is applied to an air conditioner, the air conditioner including a heating unit which heats a heat medium, a casing which allows an air flow to circulate toward a compartment, a blower which generates the air flow in the casing, and a heat exchanger disposed in the casing that heats the air flow by exchanging heat between the heat medium heated by the heating unit and the air flow. The electronic control unit includes a first temperature calculation unit that obtains an estimated blowing temperature which is an estimation value of a temperature of the air flow heated by the heat exchanger, a first determination unit that determines, based on the estimated blowing temperature, a candidate value of a target blowing air volume of the blower, a second temperature calculation unit that obtains a required blowing air temperature, which is an air temperature required to be blown from the casing into the compartment to change the air temperature in the vehicle compartment toward a set temperature, a control unit that controls the heating unit to perform a warm-up to raise a temperature of the heat medium to a target temperature, a determination unit that determines whether or not the warm-up is in a halfway state based on the estimated blowing temperature and the required blowing air temperature, a second determination unit that determines a candidate value of the target blowing air volume of the blower based on the required blowing air temperature and the estimated blowing temperature when the determination unit determines that the warm-up is in the halfway state, and sets the candidate value of the target blowing air volume of the blower as a predetermined value when the determination unit determines that the warm-up has been completed, and a third determination unit that determines the target blowing air volume of the blower by using the candidate value determined by the first determination unit and the candidate value determined by the second determination unit.

Here, as the predetermined value, a blowing air volume larger than zero is set. As a result, when the predetermined value is set as the target blowing air volume of the blower, the minimal blowing air volume can be ensured as the blowing air volume of the blower when the warm-up has been completed, even when the air conditioning load in the interior is small. In other words, when the warm-up has been completed, even when the air conditioning load in the vehicle compartment is small, the minimum required blowing air volume can be ensured as the blowing air volume of the blower.

Second Embodiment

In a second embodiment, an example in which a heater unit 72 using an engine coolant water as a heat source is added in the vehicle air conditioner 1 of the first embodiment will be described.

Figure 5:
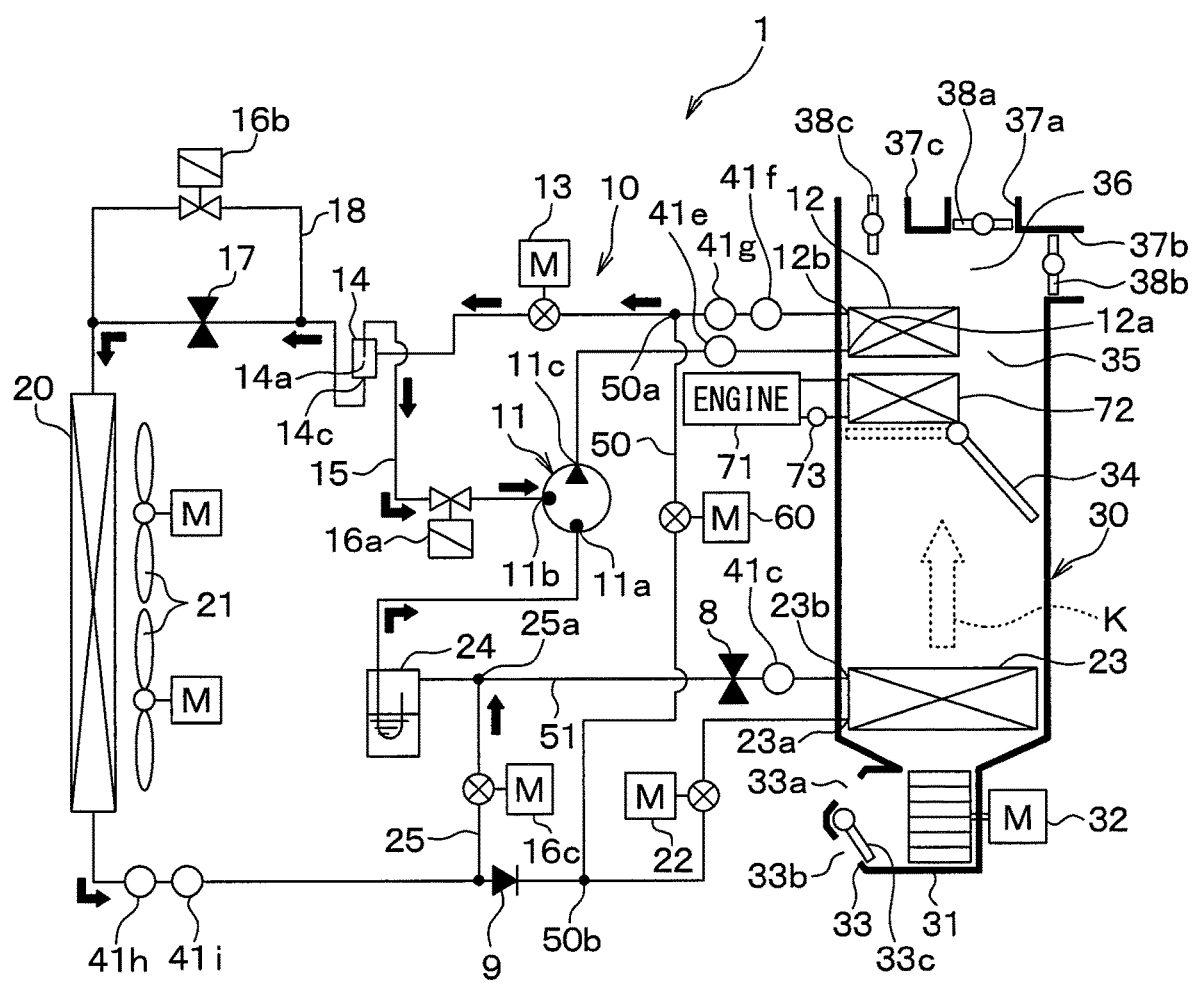
FIG. 5 is a diagram showing an overall configuration of a heat pump cycle according to a second embodiment.

FIG. 5 shows an overall configuration of a vehicle air conditioner 1 according to the present embodiment. In FIG. 5, the same reference numerals as those in FIG. 1 denote the same components, and a description of the same components will be omitted.

The heater unit 72 is a second heat exchanger which is disposed between an interior evaporator 23 and an interior condenser 12 in a casing 31 and heats an air flow by heat exchange between the air flow passing through the interior evaporator 23 and an engine coolant water. The engine coolant water is circulated between the heater unit 72 and the travel engine 71.

According to the present embodiment, a water temperature sensor 73 is provided to detect a temperature of the engine coolant water flowing between the heater unit 72 and the travel engine 71.

A bypass passage 35 is a passage through which the air flow passing through the interior evaporator 23 bypasses the interior condenser 12 and the heater unit 72.

An air mixing door 34 adjusts an air volume ratio of an air volume passing through the interior condenser 12 and the heater unit 72 to an air volume passing through the bypass passage 35 in the blown air after passing through the interior evaporator 23 by a rotation of the air mixing door 34 to thereby adjust a heat exchange capability of the interior condenser 12.

Next, the details of the calculation process of a target value of the blowing air volume of the blower 32 according to the present embodiment will be described with reference to FIG. 6.

Figure 6:
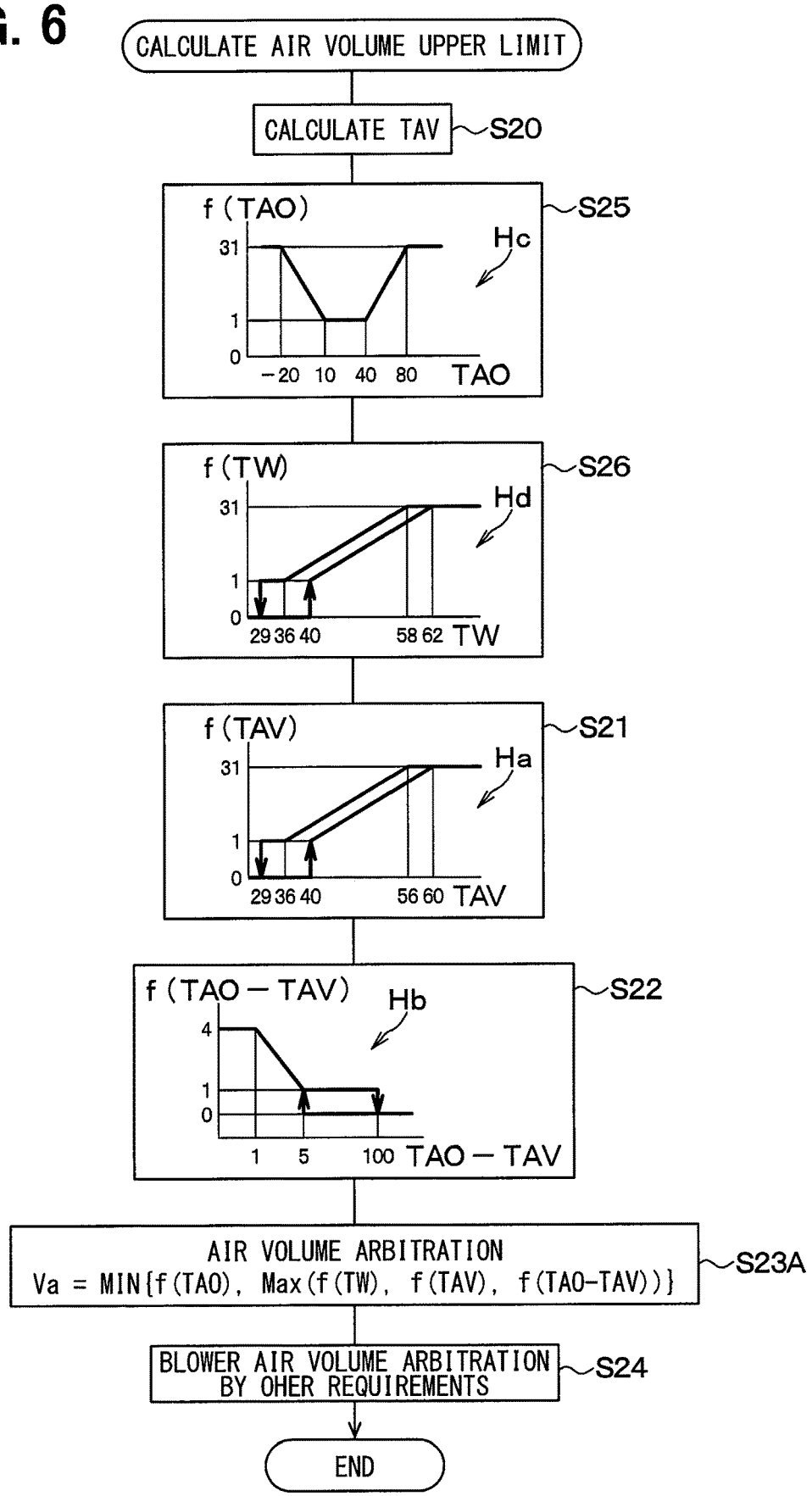
FIG. 6 is a flowchart showing a part of a control process of an electronic control unit according to the second embodiment.

FIG. 6 is a flowchart in which Steps S25, S26, and S23A are added to Steps S20, S21, and S22 in FIG. 4. In FIG. 6, the same reference numerals as those in the flowchart of FIG. 4 denote the same steps, and a description of the same steps will be omitted.

First, in Step S20, an estimated blowing temperature TAV is obtained based on a detection value of an evaporator temperature sensor 41d, a detected temperature of a refrigerant temperature sensor 41g, and a current blowing air volume of the blower 32 (that is, a blower voltage Ve).

Next, in Step S25 (that is, a fifth determination unit), a candidate value f(TAO) of a target value of the blowing air volume of the blower 32 is obtained based on a required blowing temperature TAO.

An air volume map Hc is a graph in which the horizontal axis represents the required blowing temperature TAO, the vertical axis represents the candidate value f(TAO), and the required blowing temperature TAO and the candidate value f(TAO) are specified in a one-to-one manner.

In the air volume map Hc, when the required blowing temperature TAO is smaller than the lower reference value (that is, −20), the candidate value f(TAO) is 31 which is the maximum value. When the required blowing temperature TAO is larger than the upper reference value (that is, 80), the candidate value f(TAO) becomes 31 which is the maximum value. When the required blowing temperature TAO falls within an intermediate range of 10 or more and 40 or less (that is, 10 to 40), the candidate value f(TAO) becomes 1, which is the minimum value.

When the required blowing temperature TAO is equal to or more than the upper limit value 40 of the intermediate range and is less than the upper reference value (that is, 80), the candidate value f(TAO) increases more as the required blowing temperature TAO increases more.

When the required blowing temperature TAO is equal to or lower than the lower limit value 10 of the intermediate range and equal to or higher than the lower reference value (that is, −20), the candidate value f(TAO) increases more as the required blowing temperature TAO decreases more.

In the air volume map Hc configured as described above, the candidate value f(TAO) specified in a one-to-one relationship with respect to the required blowing temperature TAO is determined.

Next, in Step S26 (that is, a fourth determination unit), a candidate value f(TW) of the blowing air volume of the blower 32 is obtained based on the air volume map Hd and the engine coolant water temperature (hereinafter, referred to as the coolant water temperature TW), which is the detection value of the water temperature sensor 73.

The air volume map Hd is a graph in which the horizontal axis represents the coolant water temperature TW, the vertical axis represents the candidate value f(TW), and the coolant water temperature TW and the candidate value f(TW) are specified in a one-to-one manner. The air volume map Hd corresponds to a first air volume map.

In the air volume map Hd, when the coolant water temperature TW is smaller than the lower references values (that is, 29, 40), the candidate value f(TW) becomes zero, which is the minimum value. Those lower reference values correspond to the first lower reference values. When the coolant water temperature TW is larger than the upper reference values (that is, 58, 62), the candidate value f(TW) becomes 31 which is the maximum value. Those upper reference values correspond to the first upper reference values. When the coolant water temperature TW is between the lower reference values (that is, 29, 40) and the upper reference values (58, 62), the candidate value f(TW) gradually increases from the lower reference values (that is, 29, 40) toward the upper reference values (that is, 58, 62).

In the air volume map Hd, when the coolant water temperature TW becomes smaller than the lower reference value 29, the candidate value f(TW) becomes the minimum value (that is, zero). When the coolant water temperature TW is increasing, a hysteresis characteristic is set in which the candidate value f(TW) becomes larger than the minimum value (that is, zero) when the coolant water temperature TW becomes equal to or higher than the lower reference value 40.

In the air volume map Hd, when the coolant water temperature TW is decreasing, if the coolant water temperature TW becomes equal to or lower than the upper reference value 58, the candidate value f(TW) becomes smaller than the maximum value (that is, 31). When the coolant water temperature TW is increasing, a hysteresis characteristic is set in which the candidate value f(TW) becomes the maximum value (that is, 31) when the coolant water temperature TW becomes equal to or higher than the upper reference value 62.

In the air volume map Hd configured as described above, the candidate value f(TW) specified in a one-to-one relationship with respect to the coolant water temperature TW is determined.

Next, in Step S21, similarly to the first embodiment, the candidate value f(TAV) of the target blowing air volume of the blower 32 is obtained based on the air volume map Ha and the estimated blowing temperature TAV.

Next, in Step S22, as in the first embodiment, a target blowing air volume candidate value f(TAO−TAV) of the blower 32 are obtained based on the blowing air volume map Hb and the deviation (TAO−TAV).

In this example, the maximum value (that is, 4) of the candidate value f(TAO−TAV) of the air volume map Hb is smaller than the maximum value (that is, 31) of the candidate value f(TAO) of the air volume map Hc, and is smaller than the maximum value (that is, 31) of the candidate value f(TW) of the air volume map Hd. Further, the maximum value is smaller than the maximum value (that is, 31) of the candidate value f(TAV) in the air volume map Ha.

The maximum value (that is, 4) of the candidate value f(TAO−TAV) of the air volume map Hb is larger than the minimum value (that is, zero) of the candidate value f(TAO) in the air volume map Hc and larger than the minimum value (that is, zero) of the candidate value f(TW) of the air volume map Hd. Further, the maximum value is larger than the minimum value (that is, zero) of the candidate value f(TAV) in the air volume map Ha.

Next, in Step S23A, the largest candidate value Maxf among the candidate value f(TW) determined in Step S26, the candidate value f(TAV) determined in Step S21, and the candidate value f(TAO−TAV) determined in Step S22 is selected. The candidate value Maxf is Max(f(TW), f(TAV), f(TAO−TAV)).

The smaller candidate value of the selected candidate value Maxf and the candidate value f(TAO) determined in Step S25 is defined as an upper limit value Va of the blowing air volume {=Min(TAO), Max(f(TW), f(TAV), f(TAO−TAV))}.

Next, in Step S24, the upper limit value Va of the blowing air volume determined in this manner and the candidates determined by the requirements other than the blowing air volume maps Ha, Hb, Hc, and Hd are arbitrated to obtain the target blowing air volume.

The electronic control unit 40 according to the present embodiment described above includes Step S25 of determining a candidate value f(TW) of the target blowing air volume of the blower 32 based on the coolant water temperature TW and the air volume map Hd. Step S23A selects the largest candidate value MAXf among the candidate value f(TW) determined in Step S26, the candidate value f(TAV) determined in Step S21, and the candidate value f(TAO−TAV) determined in Step S22. A small candidate value of the selected candidate value and the candidate value f(TAO) determined in Step S25 is set as the upper limit value Va of the blowing air volume. As a result, the upper limit value Va of the blowing air volume can be determined as the target blowing air volume by arbitration between the upper limit value Va of the blowing air volume and other requirements.

As described above, similarly to the first embodiment, the target blowing air volume of the blower 32 can be appropriately determined.

For example, when the warm-up has been completed and the air conditioning load in the vehicle compartment is small, since the estimated blowing temperature TAV becomes equal to or lower than the lower reference value, a value equal to or lower than 1 is determined as the candidate value f(TAV) based on the air volume map Ha.

On the other hand, since the deviation (TAO−TAV) becomes zero when the warm-up has been completed, the maximum value (that is, 4) is determined as the candidate value f(TAO−TAV) based on the air volume map Hb.

In this example, when a value larger than 4 is determined as the candidate value f(TW) by the air volume map Hd and the coolant water temperature Tw, the candidate value f(TW) is determined as the candidate value MAXf. When a value of 4 levels or less is determined as the candidate value f(TW) by the air volume map Hd and the coolant water temperature Tw, the maximum value (that is, 4) of the TAO−TAV is determined as the candidate value MAXf.

Further, a value of 40 or more is calculated as the required blowing temperature TAO at the time of heating. For that reason, a value larger than the lowest value (that is, 1) is selected as the candidate value f(TAO) based on the air volume map Hc and the required blowing temperature TAO. As a result, a value larger than at least 1 is determined as the upper limit value Va(=Min(f(TAO), Max(f(TW), f(TAV), f(TAO−TAV)))).

Therefore, when the upper limit value Va is determined as the target blowing air volume of the blower 32 by the arbitration between the upper limit value Va and other requirements, even when the warm-up is completed and the air conditioning load in the vehicle compartment is small, the required minimum blowing air volume can be ensured as the blowing air volume of the blower 32.

In addition, when the air conditioning load in the vehicle compartment is large and the warm-up is in the halfway state, the deviation (TAO−TAV) is high (for example, 25° C.), and the candidate value f(TAO−TAV) becomes a value of 0 level. In that case, when the estimated blowing temperature TAV rises to 45° C. as an example, the candidate value f(TAV) becomes a value of 8.5 level. For that reason, the candidate value f(TAV) is selected as the larger candidate value MAXf of the candidate value f(TAV) and the candidate value f(TAO−TAV).

For that reason, the candidate value f(TW) or the candidate value f(TAV) is selected as Max{f(TW), f(TAV), f(TAO−TAV)}.

In this example, when the coolant water temperature Tw rises to 50° C. as an example, the candidate value f(TW) becomes a value of 14 level. At this time, when the required blowing temperature TAO becomes 60, the candidate value f(TAO) becomes a value of 16 level.

For that reason, a value of 14 level (=candidate value f(TW)) is selected as the upper limit value Va (Min{f(TAO), Max(f(TW), f(TAV), f(TAO−TAV))}).

Therefore, the candidate value f(TW) is determined as the target blowing air volume of the blower 32 by arbitration between the candidate value f(TW) and the candidate value determined by other requirements. Then, even when the air conditioning load in the vehicle compartment is large, the blowing air volume of the blower 32 can be reduced and the cold air can be inhibited from blowing out the cold air from the foot opening portion 37c into the vehicle compartment.

Other Embodiments (1) In the first and second embodiments described above, an example in which the air conditioner according to the present disclosure is used as the vehicle air conditioner 1 has been described, but instead of the above example, the air conditioner according to the present disclosure may be various types of air conditioners other than the vehicle air conditioner 1.

(2) In the first embodiment, an example in which the upper limit value Va(=Max(f(TAV),f(TAO−TAV))) of the blowing air volume determined in the above Step S23 and the upper limit value of the blowing air volume determined by other requirements are arbitrated to obtain the target blowing air volume has been described. However, the present disclosure is not limited to the above example, and the arbitration may be abolished, and the upper limit value Va(=Max(f(TAV),f(TAO−TAV))) may be set as the target blowing air volume.

Further, the first embodiment and the second embodiment may be combined with each other. In other words, the smaller candidate value may be selected from the upper limit value Va(=Max(f(TAV),f(TAO−TAV))) of the blowing air volume determined in the above Step S23 and a candidate value f(TAO) selected in the air volume map Hc. Further, the above candidate value and the candidate value determined by other requirements may be arbitrated to determine the target blowing air volume.

Alternatively, the small candidate value may be selected from the upper limit value Va of the blowing air volume determined in Step S23 and the candidate value f(TAO) selected in the air volume map Hc, and the selected candidate value may be set as the target blowing air volume.

(3) In the above second embodiment, an example in which the upper limit value Va of the blowing air volume determined in the above Step S23A and the upper limit value of the blowing air volume determined by other requirements are arbitrated to obtain the target blowing air volume has been described above, but the present disclosure is not limited to the above example, and the arbitration may be abolished and the upper limit value Va may be set as the target blowing air volume.

(4) In the above first and second embodiments, an example in which the estimated blowing temperature TAV is obtained by the evaporator temperature Te, which is the detection value of the evaporator temperature sensor 41d, the blowing air volume of the blower 32, and the detected temperature of the refrigerant temperature sensor 41g has been described. However, instead of the above example, a temperature sensor for detecting the temperature of the air blown out from the interior condenser 12 may be adopted, and the detection value of the temperature sensor may be set as the estimated blowing temperature TAV.

Alternatively, the estimated blowing temperature TAV may be obtained based on the detected pressure of the refrigerant pressure sensor 41f. Specifically, the estimated blowing temperature TAV may be calculated based on the evaporator temperature Te, which is a detection value of the evaporator temperature sensor 41d, the blowing air volume of the blower 32, and the detected pressure of the refrigerant pressure sensor 41f.

(5) In carrying out the present disclosure, in the above first and second embodiments, the interior air conditioning unit 30 configured to divide the air passage in the casing 31 into an outside air passage and an inside air passage may be employed.

(6) It should be noted that the present disclosure is not limited to the embodiments described above, and can be modified as appropriate. The above embodiments are not independent of each other, and can be appropriately combined together except when the combination is obviously impossible. In each of the embodiments described above, it is needless to say that the elements configuring the embodiment are not necessarily indispensable except when it is clearly indicated that the elements are particularly indispensable, when the elements are clearly considered to be indispensable in principle, and the like. Further, in each of the embodiments described above, when the numerical values such as the number, numerical value, quantity, range, and the like of the constituent elements of the embodiment are referred to, except in the case where the value is expressly indispensable in particular, the case where the value is obviously limited to a specific number in principle, and the like, the present disclosure is not limited to the specific number. Further, in each of the embodiments described above, when referring to the shape, positional relationship, and the like of the component and the like, it is not limited to the shape, positional relationship, and the like, except for the case where the component is specifically specified, the case where the component is fundamentally limited to a specific shape, a positional relationship, and the like.

The invention claimed is:

1. An electronic control unit applied to an air conditioner, the air conditioner including a heating unit which heats a heat medium, a casing which allows an air flow to circulate toward a compartment, a blower which generates the air flow in the casing, and a heat exchanger disposed in the casing that heats the air flow by exchanging heat between the heat medium heated by the heating unit and the air flow, the electronic control unit comprising:
    a first temperature calculation unit that obtains an estimated blowing temperature which is an estimation value of a temperature of the air flow heated by the heat exchanger;
    a first determination unit that determines, based on the estimated blowing temperature, a candidate value of a target blowing air volume of the blower;
    a second temperature calculation unit that obtains a required blowing air temperature, which is an air temperature required to be blown from the casing into the compartment to change the air temperature in the vehicle compartment toward a set temperature;
    a control unit that controls the heating unit to perform a warm-up to raise a temperature of the heat medium to a target temperature;
    a determination unit that determines whether or not the warm-up is in a halfway state based on the estimated blowing temperature and the required blowing air temperature;
    a second determination unit that determines a candidate value of the target blowing air volume of the blower based on the required blowing air temperature and the estimated blowing temperature when the determination unit determines that the warm-up is in the halfway state, and sets the candidate value of the target blowing air volume of the blower as a predetermined value when the determination unit determines that the warm-up has been completed; and
    a third determination unit that determines the target blowing air volume of the blower by using the candidate value determined by the first determination unit and the candidate value determined by the second determination unit.

2. The electronic control unit according to claim 1, wherein the third determination unit determines the target blowing air volume of the blower by using a largest candidate value among the candidate value determined by the first determination unit and the candidate value determined by the second determination unit.

3. The electronic control unit according to claim 1, wherein
    the air conditioner is applied to a vehicle including a travel engine,
    the heat exchanger is a first heat exchanger,
    a second heat exchanger that heats the air flow by heat exchange between a coolant water of the travel engine and the air flow is disposed in the casing, and
    the electronic control unit further comprises a fourth determination unit that determines a candidate value of the target blowing air volume of the blower based on a temperature of the coolant water, and
    the third determination unit determines the target blowing air volume of the blower by using a largest candidate value among the candidate value determined by the first determination unit, the candidate value determined by the second determination unit, and the candidate value determined by the fourth determination unit.

4. The electronic control unit according to claim 3, further comprising:
    a fifth determination unit that determines a candidate value of the target blowing air volume based on the required blowing air temperature, wherein
    the third determination unit selects a largest candidate value among the candidate value determined by the first determination unit, the candidate value determined by the second determination unit, and the candidate value determined by the fourth determination unit, and determines the target blowing air volume of the blower by using a smaller candidate value of the selected candidate value and the candidate value determined by the fifth determination unit.

5. The electronic control unit according to claim 4, further comprising
    a storage unit that stores an air volume map which associates the temperature of the coolant water with candidate values in a one-to-one manner to set the candidate value of the target blowing air volume to a maximum value when the temperature of the coolant water is more than an upper reference value, to set the candidate value of the target blowing air volume to a minimum value when the temperature of the coolant water is less than a lower reference value which is lower than the upper reference value, and to set the candidate value of the target blowing air volume to be larger as the temperature of the coolant water is larger when the temperature of the coolant water is between the lower reference value and the upper reference value, wherein
    the fourth determination unit determines the candidate value of the target blowing air volume of the blower based on the temperature of the coolant water and the air volume map.

6. The electronic control unit according to claim 5, wherein the air volume map is a first air volume map,
the storage unit is a first storage unit,
the upper reference value is a first upper reference value,
the lower reference value is a first lower reference value,
the electronic control unit further comprises a second storage unit that stores a second air volume map which associates candidate values with a deviation between the estimated blowing temperature and the required blowing air temperature in a one-to-one manner to set the candidate value of the target blowing air volume of the blower to a minimum value when the deviation is more than a second upper reference value, to set the candidate value of the target blowing air volume to a maximum value when the deviation is less than a second lower reference value which is less than the second upper reference value, and to set the candidate value of the target blowing air volume to be smaller as the deviation is larger when the deviation is between the second lower reference value and the second upper reference value, and
the second determination unit determines the candidate value of the target blowing air volume based on the deviation and the second air volume map when the determination unit determines that the warm-up is in the halfway state.

7. The electronic control unit according to claim 6, further comprising
a third storage unit that stores a third air volume map which associates candidate values with the estimated blowing temperature in a one-to-one manner to set the candidate value of the target blowing air volume to a maximum value when the estimated blowing temperature is more than a third upper reference value, to set the candidate value of the target blowing air volume to a minimum value when the estimated blowing temperature is less than a third lower reference value which is less than the third upper reference value, and to set the candidate value of the target blowing air volume to be larger as the estimated blowing temperature is higher when the estimated blowing temperature ranges between the third lower reference value and the third upper reference value, wherein
the first determination unit determines the candidate value of the target blowing air volume based on the estimated blowing temperature and the third air volume map.

8. The electronic control unit according to claim 7, wherein the predetermined value is more than the minimum value of the candidate value of the target blowing air volume in the third air volume map.

9. The electronic control unit according to claim 1, wherein the determination unit determines whether or not the warm-up is in the halfway state based on a deviation between the estimated blowing temperature and the required blowing air temperature.

10. An air conditioning system for a vehicle, comprising:
a heating unit that heats a heat medium;
a casing configured to allow an air flow to circulate toward a vehicle compartment of the vehicle;
a blower configured to generate the air flow in the casing;
a heat exchanger disposed in the casing configured to heat the air flow by exchanging heat between the heat medium heated by the heating unit and the air flow; and
an electronic control unit coupled to the heating unit and the blower, wherein
the electronic control unit includes at least one processor programmed to:
obtain an estimated blowing temperature which is an estimation value of a temperature of the air flow heated by the heat exchanger,
determine, based on the estimated blowing temperature, a first candidate value for a target blowing air volume of the blower,
obtain a required blowing air temperature, which is an air temperature required to be blown from the casing into the vehicular compartment to change the air temperature in the compartment toward a set temperature,
control the heating unit to perform a warm-up to raise a temperature of the heat medium to a target temperature,
after controlling the heating unit to perform the warm-up, determine whether the warm-up is in a halfway state or has been completed based on the estimated blowing temperature and the required blowing air temperature,
upon determining that the warm-up is in the halfway state, determine a second candidate value for the target blowing air volume of the blower based on the required blowing air temperature and the estimated blowing temperature,
upon determining that the warm-up has been completed, set the second candidate value of the target blowing air volume of the blower as a predetermined value when the determination unit determines that the warm-up has been completed, and
after determining the first candidate value and the second candidate value, drive the blower with an applied voltage calculated based on the first candidate value and the second candidate value.

* * * * *